United States Patent [19]

White et al.

[11] 4,081,365

[45] Mar. 28, 1978

[54] METHODS FOR USE IN WATER PURIFICATION PARTICULARLY SEWAGE TREATMENTS

[75] Inventors: Eugene B. White, Oak Park; Mahindar N. Sharma, Lake Zurich, both of Ill.

[73] Assignee: Filters International Inc., Chicago, Ill.

[21] Appl. No.: 429,488

[22] Filed: Jan. 2, 1974

[51] Int. Cl.² ............... C02B 1/20; C02B 1/34; C02C 1/02; C02C 5/04

[52] U.S. Cl. ............................ 210/3; 210/18; 210/28; 210/32; 210/40; 210/47; 210/52; 210/63 R; 210/80

[58] Field of Search ............... 210/3, 18, 28, 36, 80, 210/290, 8, 15, 17, 32, 40, 47, 52, 54, 81, 82, 145 R, 203, 275, 51, 274, 63 R

[56] References Cited

U.S. PATENT DOCUMENTS

| | | | |
|---|---|---|---|
| 2,546,650 | 3/1951 | Nijboer | 210/80 |
| 3,171,804 | 3/1965 | Rice | 210/80 |
| 3,343,680 | 9/1967 | Rice et al. | 210/263 |
| 3,635,817 | 1/1972 | Zuckerman et al. | 210/28 |
| 3,673,083 | 6/1972 | Sawyer et al. | 210/18 |
| 3,680,701 | 8/1972 | Holca | 210/80 |
| 3,698,554 | 10/1972 | Mail | 210/80 |
| 3,709,364 | 1/1973 | Savage | 210/80 |
| 3,717,251 | 2/1973 | Hampton | 210/80 |
| 3,728,253 | 4/1973 | Kaufman | 210/18 |
| 3,841,998 | 10/1974 | Farrell | 210/3 |
| 3,876,546 | 4/1975 | Hsiung et al. | 210/290 |
| 3,907,673 | 9/1975 | Belk et al. | 210/17 |
| 3,968,034 | 7/1976 | Tymoszczuk | 210/17 |

*Primary Examiner*—Thomas G. Wyse

*Attorney, Agent, or Firm*—Hill, Gross, Simpson, Van Santen, Steadman, Chiara & Simpson

[57] ABSTRACT

A method and apparatus for treatment of sewage and waste materials, and while applicable to larger installations, is particularly desirable for relatively small, for example family and multi-family installations, utilizing high rate bio-chemical oxidation/physio-chemical adsorption, in which the sewage is subjected to a primary biological treatment, and a secondary settling treatment, with the primary-secondary effluent, following addition thereto of an organic-inorganic chemical material comprising prereacted floc, a phosphate precipitating material and a nonionic polyelectrolyte, operative to maintain pH and zeta potential favorable to floccuation, being subjected to a tertiary treatment by passage through a mixed filtration and adsorption bed containing activated carbon, the mixed bed being periodically regenerated by a partial wet-gas oxygenation cycle, utilizing a reflux operation in which the products of regeneration are returned to the primary treatment, and in which the final effluent may, for example, contain an average of less than 1 mg/l $BOD_5$ and an average of less than 0.6 mg/l of suspended solids, an average of less than 0.3 mg/l phosphorus (as $PO_4$), and with a material reduction in sludge. The invention also provides fully automatic cyclic operation and includes a novel tertiary method and structure, including regeneration thereof, as well as the chemical materials utilized and the method of use therof. In a preferred form of the invention, the chemicals are produced as a dry homogeneous discrete material which may be readily transported and handled in dry form, and formed into an aqueous mix or slurry at time of ultimate use.

97 Claims, 11 Drawing Figures

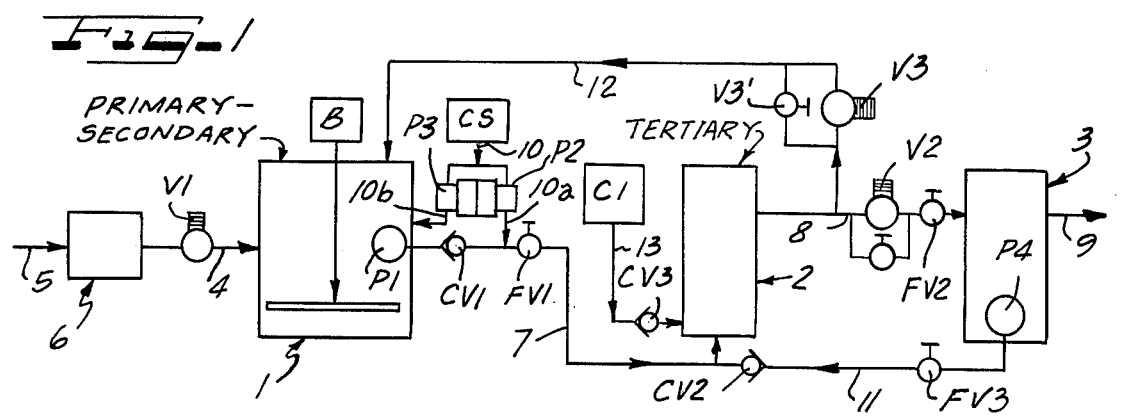
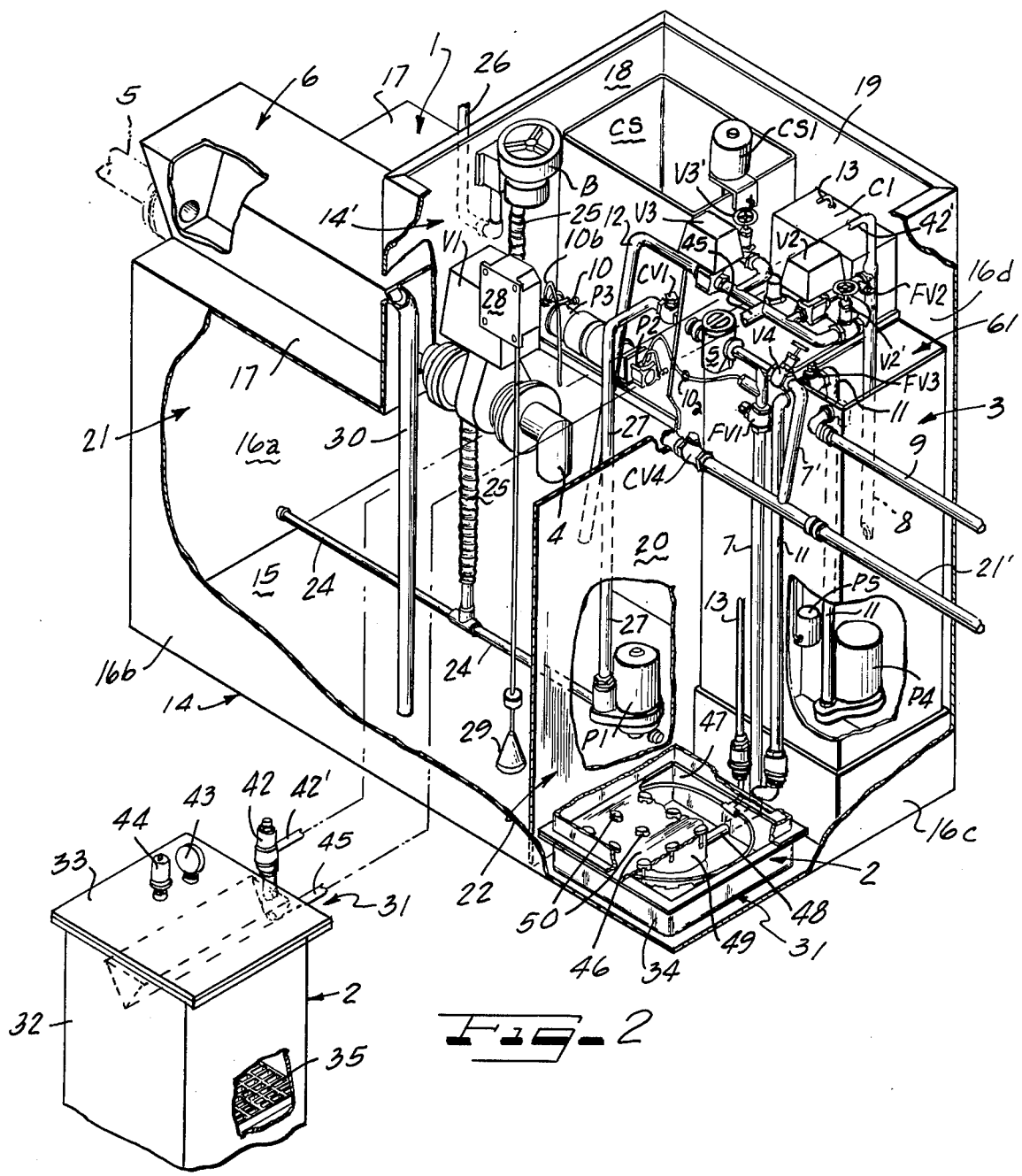

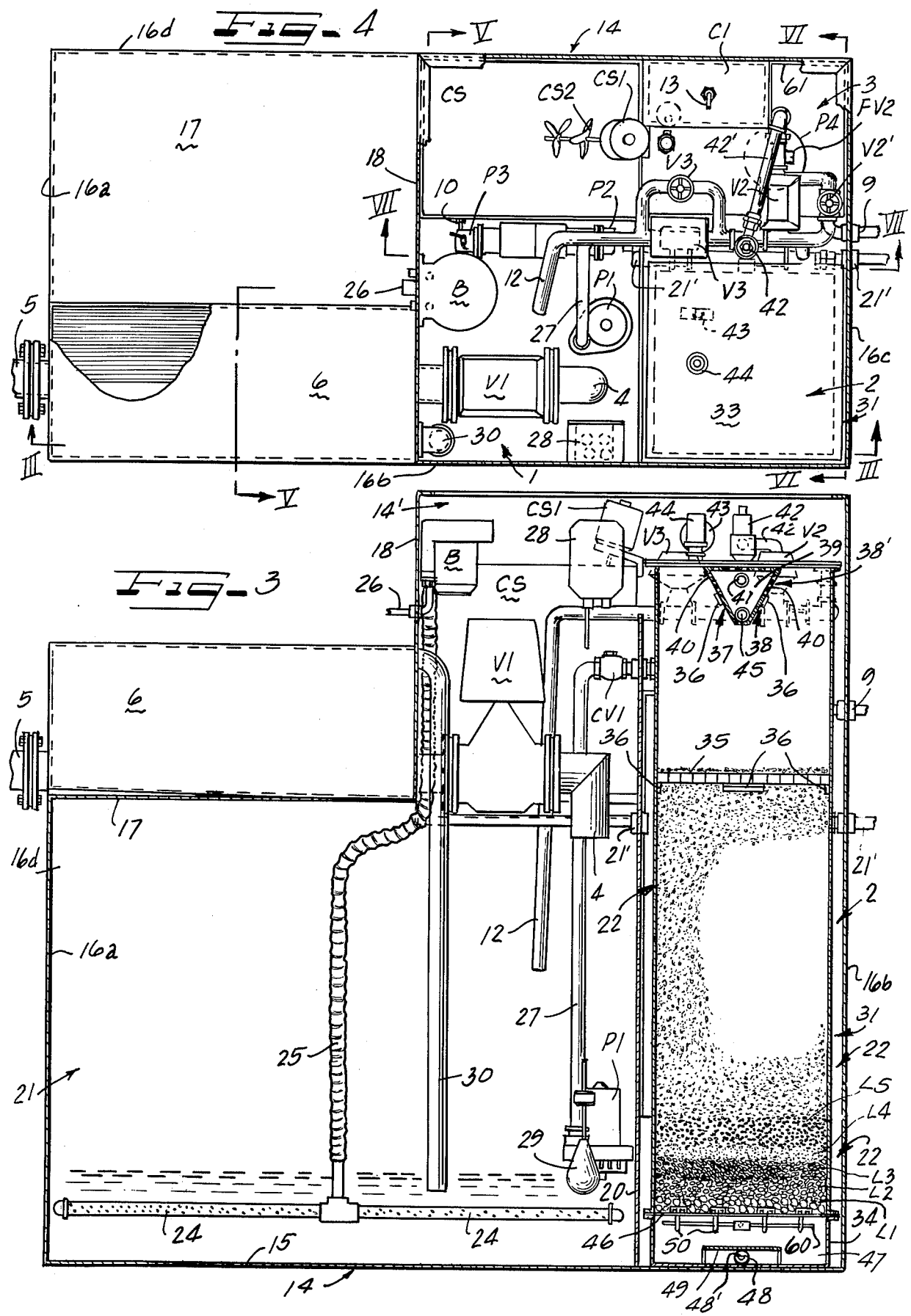

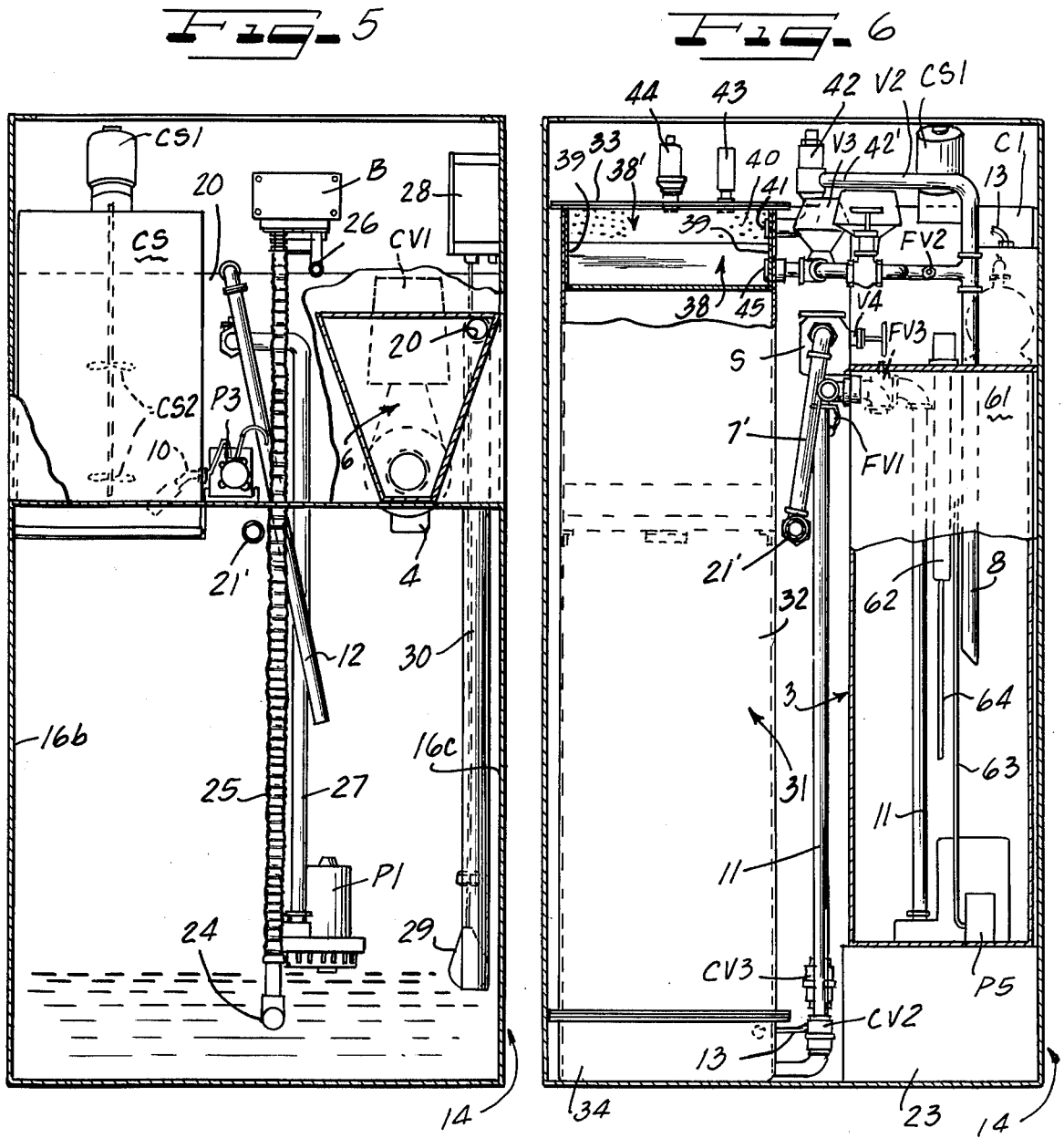

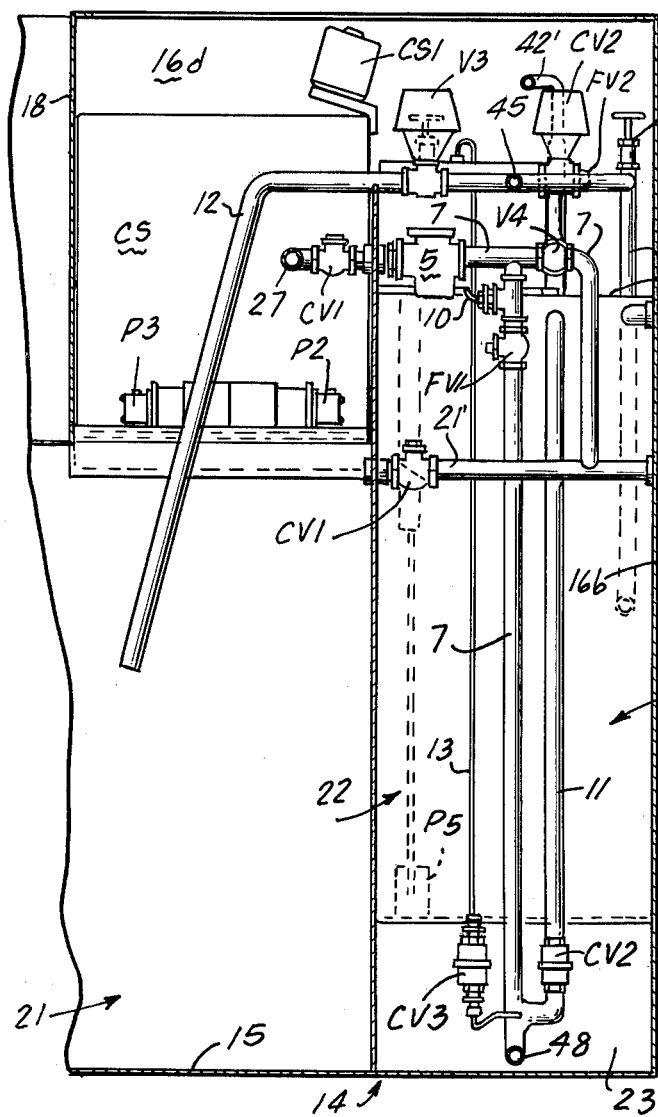
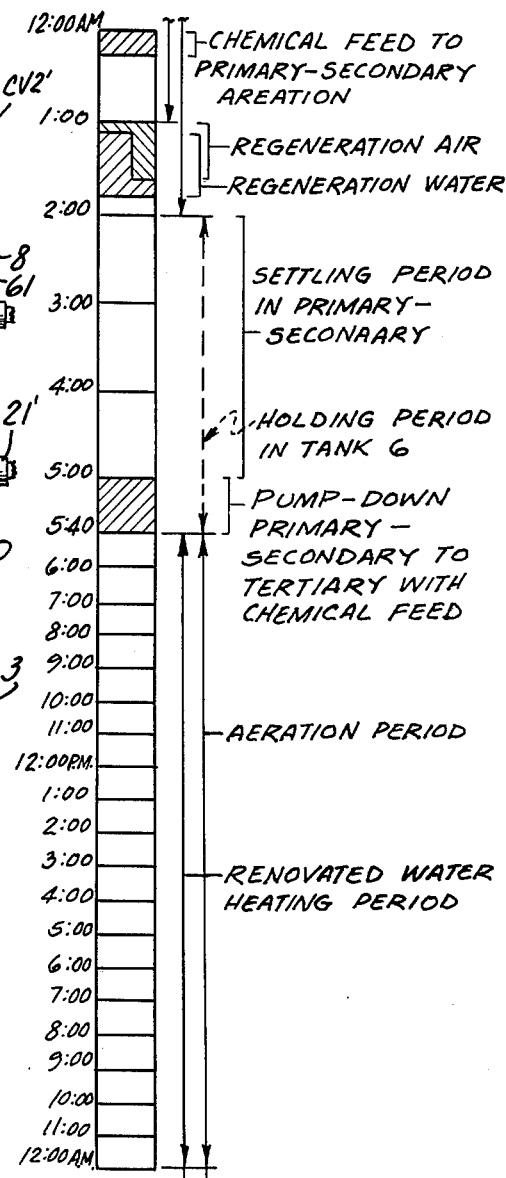
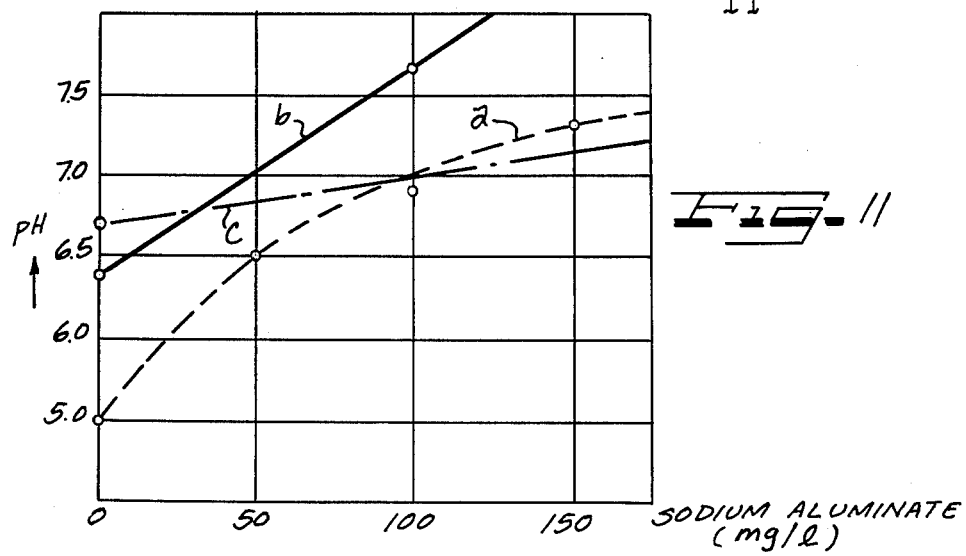

METHODS FOR USE IN WATER PURIFICATION PARTICULARLY SEWAGE TREATMENTS

BACKGROUND OF THE INVENTION

In the treatment of sewage, particularly involving single-family installations, the so-called "Septic systems" have been employed for many years, which systems employed solely anaerobic action in a suitable container and subsequent discharge of effluent into a suitable ground field.

More recently, various types of packaged waste treatment plants have been developed, which usually employ a modified activated sludge/extended aeration process, with the final plant effluent normally containing approximately 25 ppm $BOD_5$ and approximately 50 ppm of suspended solids, chlorine, for example in tablet form, being utilized to provide final disinfection.

Systems employing granular-activated carbon are also known, and considerable data is at hand as to area and height of beds thereof, flows involved, as well as carbon reactivation requirements. For example, see U.S. Pat. No. 3,455,820. The use of carbon columns thus involves additional considerations. In addition to other problems as to size requirements etc., the carbon must be backwashed and eventually reactivated or replaced, the carbon usually being removed and heated in a furnace or kiln to a sufficient temperature to oxidize the adsorbed materials thereon, but insufficient to oxidize the carbon, for example 1500°-1700° F.

In addition, various procedures for "wet oxidative" reactivation of spent active carbon has also been devised utilizing air and water, the temperatures involved running from 125° C to 300° C or higher and may include relatively high pressures. See, for example, U.S. Pat. Nos. 3,150,105 and 3,386,922. It will be noted that operations of this type normally involve the removal of the carbon from the apparatus involved and reactivation in a suitable kiln, autoclave or the like, the operation normally taking at least a matter of hours. Operations of this type, requiring removal of the carbon from the apparatus involved, thus necessitate the use of standby units for operation when a spent unit is being reactivated, necessitating a greater number of units than actually required for the sewage treatment. Consequently, the use of carbon columns has been limited to installations that make the inclusion of a carbon column and means for reactivating the same both practical and feasible economically.

More recently the importance of the zeta potential (ZP), a long known principle of physical chemistry, has been recognized in connection with coagulation, particularly in connection with difficult raw-water colloids. The zeta potential is a measure of the electro-kinetic charge (in millivolts) that surrounds particulate matter. The charge on raw-water turbidity and suspended matter in domestic sewage is, on the average, predominately electro-negative and is strong enough to cause significant mutual repulsion, so that while coarse fractions, for example, ranging in particle diameter from 1 mm to 1 micron, may be relatively readily removed by conventional coagulation, fine colloidal fractions, for example, ranging from 1 micron to 10 Angstrom units, cannot. In such case the colloidal size prevents sedimentation and its electro-negative zeta potential (which may be in the range of −15 to −25 mv) prevents agglometaion.

In connection with the study of zeta potential reference is made to the following publications:

Zeta Potential: New Tool For Water Treatment, Thomas M. Riddick, Chemical Engineering, June 26, 1961, July 10, 1961 McGraw-Hill Publishing Company, Inc.

Role of the Zeta Potential in Coagulation Involving Hydrous Oxides, Thomas M. Riddick, Tappi, The Journal of the Technical Association of The Pulp and Paper Industry, Volume 47, No. 1, Jan., 1964

Zeta-Meter Helps Filter-Rate Study, D. Lamoureux, Water and Pollution Control (Formerly Canadian Municipal Utilities), Aug., 1965

As will be apparent from the reference articles, the actual mechanics of the zeta potential and reduction in zeta potential of floc is not precisely factually known at the present time and explanations thus involve theoretical concepts. One such concept is described in the first mentioned article while the second mentioned article refers to the coating of each colloid with sufficient adsorbed hydrous oxides to bring its zeta potential to zero.

As a result, small systems have involved installations such as previously described, with the additional utilization of bacteria-enzymes etc. in an effort to achieve rapid degredation. However, substantially all systems, particularly if the system is intended to bring the ultimate effluent within currently accepted standards, involve a considerable number of individual steps, requiring corresponding number of tanks, etc., with none of the systems actually being fully automatic, whereby no operating personnel are required. It will be appreciated that this problem is somewhat analagous to the electronic field wherein almost any electronic problem can be solved if size, number of components, complexity and costs are not of critical importance. Likewise, in water purification, almost any degree of purification can be achieved if the number of stages, vessels, filters, columns, multiple chemical treatments, size, cost and complexity are not controlling factors.

A very interesting and comprehensive study of waste water treatment concepts including a review of known types of systems (as of 3-1972) will be found in the treatise "Advanced Waste Water Treatment Concepts" by Dr. James E. Young, P.E. Research Consultant in Environmental Engineering, General Filter Company, Ames, Iowa, appearing in Bul. No. 7221, 3-72-2M-W, entitled "GFC Conservation for 'better water'", published by General Filter Co.

BRIEF SUMMARY OF THE INVENTION

The invention is directed to a sewage system, particularly for relatively small installations, for example, one or multiple family units, as distinguished from municipal systems and the like, although, apparatus embodying the present invention, readily may be increased as to capacity, for example fifty persons and larger, and if desired, the apparatus may be utilized in multiples. The method and apparatus of the invention is readily adapted to automatic cyclic operation whereby constant maintenance or monitoring of the operation of eliminated, with only periodic replenishment of chemicals employed therewith being involved.

The system utilizes a combination primary-secondary treatment including phosphate removal, involving zeta potential control by destabilization and flocculation, as well as pH control, followed by a tertiary treatment having an upflow mixed media mineral filtration bed and associated activated carbon adsorption bed, with reactivation of the carbon being achieved in a novel reflex, wet-oxidation operation which takes place in-situ, and the reactivation products returned to the primary and secondary treatment. As a result of such reflex action, a high degree of efficiency is achieved in the oxidation procedures, and sludge deposits in the primary-secondary operations are also materially reduced, whereby the system may be operated over relatively long periods of time without excessive sludge accumulation in the primary-secondary system, whereby cleaning operations may be required only at exceptionally long intervals.

The system herein described and illustrated may be readily cyclically operated, employing, for example, a 24-hour cycle, in which aeration in the primary-secondary unit takes place over a period of maximum use of the system, for example from early morning hours to late evening hours, followed by a period of settling during the after-midnight hours, and a relatively brief period during a "pump-down" cycle, i.e. during which effluent is pumped through the tertiary unit. Regeneration of the tertiary unit may take place automatically, for example during the aeration cycle, particularly near the end of the latter. The regeneration cycle involves the use of water, advantageously renovated water received from the previous pump-down cycle and preferably heated to a suitable temperature, for example 160° F., which is passed through the tertiary unit, in the same direction as flow during the pump-down cycle, air under pressure being similarly admitted to the tertiary unit, preferably initially only air, followed by a combined air and water flow and terminated with a flushing operation employing only water. The purged water and contents discharged from the tertiary unit are returned to the primary-secondary unit.

The invention employs both inorganic and organic chemicals for phosphate removal, flocculation and agglomeration of suspended and colloidal materials, control of zeta potential and control of pH, which are introduced into the system as an aqueous mix or slurry, the material preferably being initially produced as a homogeneous discrete dry material which may be readily handled and transported, and mixed with water prior to its use in the system.

It will be appreciated that the character of sewage to be treated may vary widely, both as to inorganic and organic content, and thus also as to its pH value, and the chemical material here involved may be, in effect, "tailor-made" to average conditions associated with the sewage or wastes to be treated. By suitable selection and amounts of the chemical constituents, favorable pH values may be maintained in the system along with effective zeta potential control, whereby substantially instant flocculation and very rapid agglomeration of suspended and colloidal materials results.

While a number of inorganic materials may be employed, depending upon the specific application, comprising those commonly employed in water and sewage treatment, i.e. aluminum and iron sulphates, sodium aluminate and ferric chloride, as hereinafter discussed in detail, is believed that in most applications aluminum sulphate and/or sodium aluminate will be preferable from the standpoint of cost, efficiency in use, absence of color and taste problems, etc. Such combinations with aluminum salts provide a substantially universal material capable of use with the present invention in substantially any application, and in view of the advantages of such material, it is believed that the other materials may normally be relegated to usage only when their specific characteristics would, in specific applications, offer some advantage over the use of the preferred materials.

In general, the chemical material will comprise an inorganic agglomeration-promoting material, preferably an organic non-ionic high molecular weight polyelectrolyte, an inorganic material for effecting phosphate removal if such removal is included, and a material for providing a floc for colloidal and suspended material agglomeration. The floc-producing material and that employed in phosphate removal may be the same or different materials. Thus, assuming that aluminum sulphate or sodium aluminate are employed as such materials, selection will normally be determined by the character of the sewage to be treated. Likewise, where aluminum or other sulphate is employed as the flocculent, an inorganic material reactive therewith, such as soda ash, i.e., sodium carbonate, or operational equivalent is included whereby the desired amount of floc will be produced.

The various chemicals, contrary to prior teaching, may be mixed together and supplied as a liquid or suspension of prereacted floc. Where the sewage involved has an average pH relatively close to 7, and includes phosphates which are to be removed, normally aluminum sulphate may be employed for the phosphate removal, with the pH of the effluent being maintained close to 7 and control of zeta potential effected by destabilization. On the other hand, if the sewage or waste has an average pH that is relatively low, i.e. acidic, it may be preferable to employ sodium aluminate for phosphate removal, with the latter thus having a greater effect on the pH, again bringing it up close to 7, i.e. 6.8 to 7.1. Intermediate control may be achieved by a mixture of both salts in suitable proportions.

Preferably the chemical mixture is supplied in two different steps, part to the tertiary unit with the effluent from the primary-secondary unit, by injection in measured amounts into the supply line from the primary-secondary unit to the tertiary unit, and part supplied directly to the primary-secondary unit, for example just prior to the settling cycle. The invention enables, for example, the production of a compact, highly efficient aerobic sewage and waste system that replaces the septic tank, for example, having a 500 gal. per day capacity (adequate for at least six persons), with the achievement of organic reduction in excess of 99%, as compared with the 25% to 40% reduction of the traditional septic tank system, and results in the production of reusable water of high purity, i.e. removal of 99% of all solids, odor and tastes in the effluent as well as a material reduction in phosphates.

The system readily may be fully automatic, requiring no controlling personnel, and can be installed in any terrain, as the system requires no adsorption field tile bed. The effluent may be discharged into a stream, used for irrigation, recirculated for use in air conditioning systems and waste plumbing fixtures, etc. where permitted. By simple chlorinating and possibly reverse-osmosis procedures it even may be employed as potable water.

In addition, wastes are treated over 75% faster than standard micro-biological systems. It facilitates the rapid assimilation of oxygen by the wastes and accelerates the bio-chemical oxidation rate. The exclusive "once through" process involved eliminates the need for settling ponds and extensive sludge removal as well as numerous tanks, etc. and multifold operations. In applications where disinfection is desired or required, automatic chlorination and/or reverse-osmosis systems may be readily included.

Another feature of the invention is the provision of a novel tertiary filtration and adsorption structure and methods of operation, and regeneration thereof utilizing a wet-air oxidation.

A further feature of the invention is the production of a single chemical material in the practice of the invention which may be produced in dry or liquid form, and will provide pre-reacted floc, material for phosphate removal and a non-ionic polyelectrolyte for agglomeration promotion.

BRIEF DESCRIPTION OF THE DRAWINGS

In the drawings, wherein like reference characters indicate like or corresponding parts:

FIG. 1 is a semi-schematic flow diagram of a system employing the present invention;

FIG. 2 is an isometric view, with portions broken away and transposed, of apparatus constructed in accordance with the present invention;

FIG. 3 is a sectional view of the apparatus illustrated in FIG. 2 taken approximately on the line III—III of FIG. 4;

FIG. 4 is a plan view of the apparatus illustrated in FIG. 2, with portions broken away to simplify the disclosure;

FIG. 5 is a sectional view of the apparatus, taken approximately on line V—V of FIG. 3;

FIG. 6 is a sectional view taken approximately on the line VI—VI of FIG. 4, with portions broken away to show details of construction;

FIG. 7 is a sectional view taken approximately on the line VII—VII of FIG. 4;

FIG. 8 is a sectional view through one of the jet structures illustrated in FIGS. 2 and 3;

FIG. 9 is a sectional view, similar to FIG. 8, of a modified jet structure;

FIG. 10 is a time diagram illustrating the examplary sequence of operations over 24-hour period; and FIG. 11 is a chart illustrating the relationship of the chemicals involved with respect to pH.

GENERAL PROCEDURES

FIG. 1 illustrates a semi-schematic flow diagram depicting the general arrangement and operations employed, in which the reference numeral 1 indicates generally a primary-secondary treatment unit or stage, the reference numeral 2 a tertiary treatment unit or stage, and the reference numeral 3 a storage reservoir, for renovated water. The raw sewage enters the primary-secondary treatment stage through a supply line 4, connected to the sewage source by a line 5, preferably through an intermediate holding tank 6 with the supply to the primary-secondary treatment being controlled by a value VI, for example, a power-actuated valve disposed in the line 4. The primary-secondary stage 1 is operatively connected with the tertiary stage 2 over a pump P1 and line 7, which may have a flow controlling valve FV1 and a check valve CV1 interposted therein, with effluent discharged from the tertiary apparatus being conducted over a line 8, which may have a flow controlling valve FV2 and a power-actuated control valve V2 disposed therein, to the storage reservoir 3.

Thus the sewage may be collected in the primary-secondary treatment stage, discharge therefrom being prevented by the de-energized pump P1, and processed, for example subjected to suitable aeration, followed by a period of settling, during which the valve V1 may be closed, whereby any incoming sewage during such period may be accumulated and retained in the holding tank 6 during the settling period, so that such settling is not disturbed.

Following settling, a pump-down phase may be initiated in which pump P1 is actuated to effect pumping of the effluent in the primary-secondary stage apparatus to the tertiary treatment stage 2, with the output therefrom flowing through line 8, and open power-actuated line valve V2 therein, at a suitable rate, as determined, for example, by either or both flow control valves FV1 and FV2, into the reservoir 3, accumulating a predetermined volume of liquid therein, with excess liquid being discharged through the line 9.

As hereinafter described in detail, suitable chemical materials may be simultaneously supplied by pump P2 from a chemical supply CS, through lines 10 and 10a, to the line 7, for example between check valve CV1 and flow valve FV1, and thus act upon effluent from the primary-secondary treatment stage as it flows through line 7 into the tertiary treatment stage. At a selected period or periods, chemicals may also be discharged into the primary-secondary stage by means of a similar pump P3, through common line 10 and line 10b.

At predetermined periods following the pump-down phase the tertiary treatment apparatus may be purged or reactivated by means of a wet-oxidation process, employing for example air and water. Such process may be readily effected by the use of renovated water from the reservoir 3, preferably heated to a desired temperature, which is pumped, by means of a submerged pump P4, through line 11, flow-controlling valve FV3, check valve CV2 and line 7 into the tertiary treatment stage, with check valve CV1 preventing reverse flow into the primary-secondary treatment stage during such operation. Discharge of such water from the tertiary treatment stage takes place through a line 12, under the control of a power-actuated valve V3 with the line 12 discharging its contents into the primary-secondary treatment apparatus. Air under pressure may be supplied from an air compressor C1, through a line 13, having a check valve CV3 therein, to the tertiary treatment apparatus, in conjunction with the admission of water through the line 11, to provide a wet-air regeneration of such apparatus, as hereinafter described in detail. As illustrated, power-actuated valves V2, V3 may be by-passed by manual valves V2', and V3' for manual operation, if necessary or desired.

As subsequently discussed in detail, the system generally described is particularly adaptable for use in comparatively small installations as for example home or multiple home installations in which the various phases of operation referred to may take place cyclically over a 24-hour period, for example collecting sewage in the primary-secondary treatment stage over a period from early morning hours, for example around 5 A. M. to the midnight hours, for example around 1 A.M., during which period the contents therein are continuously aerated. At or preferably near the end of the aerating period, conduction of raw sewage to the primary-secondary stage may be discontinued and the tertiary treatment stage 2 regenerated by the wet-oxidation process described, utilizing air from compressor C1 over the line 13, and water from the reservoir 3 over line 11, with the discharge from the stage 2 being returned, over line 12, to the primary and secondary stage.

Following the end of the aeration period, a settling period may be effected, with any incoming sewage being collected in the tank 6, at the end of which settling period the output from the primary-secondary stage 1 is pumped into and through the tertiary stage 2, with the output thereof being accumulated in the reservoir 3 and any excess water discharged over the line 9, concluding a complete cycle of operation which may be immediately followed by a second collection and aeration cycle.

The chemical injected by the pumps P2–P3, comprising, for example, a mixture of prereacted floc produced from a flocculating agent, and if necessary a reactive agent therefor, a phosphate reactive material, and an agglomeration-promotion agent, operative to reduce the zeta potential to −5 to +5 ZP, produce a relatively instant floc-agglomeration, i.e., in a matter of seconds, while maintaining the pH of the effluent at a value favorable to flocculation and agglomeration, and provide colloid destabilization.

Contrary to previous, accepted teachings, favorable results are achieved with use in the apparatus, of the chemical components in the form of a mixture and while equivalent materials may be employed in accordance with established techniques in the field, preferably, as previously mentioned, there is employed for the chemical material a suitable mixture of aluminum sulfate (alum) and sodium carbonate (soda ash), sodium aluminate (or mixtures thereof) and a non-ionic polyelectrolyte, preferably a polyacrylamide.

The practice of the invention enables the achievement of exceptional highly efficient results with a bare minimum number of operative steps and a minimum amount of tanks and other equipment, at the same time enabling the achievement of a substantially completely automatic continuous operation of the system, requiring primarily only material supply maintenance at suitable intervals, for example monthly or semi-monthly, for replenishment of the chemical materials utilized.

To facilitate explanation of the invention, the apparatus initially will be described, followed by a description of the overall operation and finally details of the materials involved, background theory and the exceptional results obtained detailed.

THE APPARATUS

FIGS. 2 through 7 illustrate a preferred embodiment of the invention, providing a complete sewage system as a unitary structure, which may be readily fabricated of sheet steel (as illustrated) reinforced concrete, etc., assembled and transported to the locality of use.

In general, the device employs a single unitary tank or housing structure designated generally by the reference numeral 14, which as illustrated in FIGS. 2 and 3 is rectangular in configuration and generally L-shaped in longitudinal cross-section, having a bottom wall 15, end walls 16a, 16b, side walls 16c, 16d, a top wall 17 adjacent the end wall 16a and an upper end wall 18 extending upwardly from the top wall 17. The end wall 16c and adjacent portions of the side walls 16b and 16d are extended upwardly to the top edge of the upper wall 18, forming a vertically extending column 14', the top edge portions of which defining an access opening 19 which may be closed by a suitable cover or grill (not illustrated). A partition wall 20 extends transversely across the tank 14 between side walls 16b and 16d, with the walls 16a, 16b, 16d and 20, together with the top wall 17, defining a primary-secondary chamber 21. The partition wall 20, end wall 16c and side walls 16b and 16d define a second chamber 22, in which is disposed the tertiary treatment apparatus 2 and the renovated water reservoir 3.

In the embodiment illustrated, the tertiary unit 2 and reservoir 3 are of generally rectangular configuration, the tertiary unit 2 being supported from the bottom wall 15 while the reservoir 3 is supported on a suitable platform 23.

The unit is completely self-contained, requiring no additional tanks, ground fields, or the like and consequently may be installed either above or below ground, and in or on any terrain or structure capable of adequately supporting the same.

After placing in normal operation, it is completely automatic in operation, requiring (other than sewage connection, etc.) only electrical connection and periodic maintenance with respect to chemical replenishment.

PRIMARY-SECONDARY TREATMENT STRUCTURE

Details of the primary-secondary apparatus are illustrated in FIGS. 2, 3 and 5 and the basic structure, tank 14 and tank 6 each may be of generally conventional sheet metal construction.

Disposed adjacent the bottom of the primary-secondary chamber 21 is a suitable aerating unit 24, with air being supplied thereto by an air supply line 25, running from the unit 24 to a blower B having a suitable air inlet line 26 which, for example, may run to an air inlet on a suitable control box (not illustrated). The aerating unit 24 may be of commercial design, readily procurable on the open market, and is adapted to discharge air received from the line 25 throughout the bottom area of the chamber, with such air thus rising through the contents therein to the top surface thereof.

The contents of the chamber 21 are adapted to be withdrawn therefrom by means of the submersed discharge pump P1 which is illustrated as being operatively connected by line 27, the check valve CV1 and a strainer S to the flow control valve FV1 and line 7. It will be apparent that upon operation of the pump P1 effluent will be discharged through the line 7 until the liquid level in the chamber drops approximately to the level of the intake openings of the pump P1 as determined by a suitable float switch 28, having an actuating float 29, the switch and float structure being of known construction, commercially procurable. Check valve CV1 prevents a reverse flow.

The holding tank 6 is constructed of suitable size commensurate with the operational capacity of the apparatus and is adapted to receive raw sewage, in the embodiment illustrated, from the supply line 5. The power-actuated valve V1, disposed in the discharge line 4, may be of electro-mechanical type and is so positioned, for example in the column 14', that it may be readily serviced or replaced, if necessary, without dismantling any other portion of the system. The holding rank 6, may be of closed construction, in which case it may be provided with an overflow or vent pipe 30, the latter being laterally displaced with respect to the line 4 as will be apparent from a reference to FIGS. 2, 4 and 5.

Also, as illustrated in FIG. 2, the line 12 from the tertiary treatment apparatus 2 extends laterally into the column 14' and then downwardly with its open end disposed to discharge into the chamber 21.

The supply container CS, is operatively connected to suitable feed pumps P2 and P3, the inlet sides of which are connected over line 10 to the outlet of the container CS, illustrated as being mounted in the column 14' above the chamber 21. Any suitable means may be associated with the tank CS or with pumps P2 and P3 to insure feeding of predetermined amounts of chemicals into the line 7 over line 10a, and into the chamber 21, over line 10b or the pumps P2, P3 may be suitably constructed to feed predetermined amounts. Suitable means may be provided for effective agitation of the chemical material in the tank CS, for example an electric agitator employing an electric motor CS1 which rotates suitable agitator blades CS2, as illustrated in FIGS. 2, 3 and 5, thereby insuring a uniform feed.

The chamber 21 may be provided with an overflow pipe 2' having a flap-type check valve CV4 therein preventing a back flow. The line 7 may be provided with a by-pass line 7' communicating with the overflow line 21' whereby, if desired for any reason, effluent in the primary-secondary chamber may be pumped out the overflow line. Flow through the line 7' may be controlled by a manual valve V4.

TERTIARY TREATMENT APPARATUS

Details of the tertiary treatment stage or unit 2 are illustrated in FIGS. 2 and 3. The tertiary treatment unit comprises a generally rectangularly shaped housing or container, indicated generally by this reference numeral 31, having a tubular intermediate member 32, a top member 33 and a bottom member 34. Extending across the interior of the upper portion of the intermediate member 32 is grid member, indicated generally by the numeral 35, which in the embodiment illustrated may be of cast construction and secured to and supported by a plurality of peripheral blocks 36, welded or otherwise secured to the side walls of the member 32.

Also disposed in the upper portion of the member 32, adjacent the top member 33, is a water collection structure in the form of a trough member 37, illustrated as being of inverted generally triangular configuration in transverse cross-section, having a lower imperforate section 38, an upper perforate section 38' and respective end walls 39, with the perforate side wall portions 40 forming the liquid inlet of the structure. The perforate section, which may comprise a suitable screen or the like, is provided with openings of a size to provide adequate liquid flow through the screen but prevent the passage of particles of predetermined size into the trough. The latter is also provided with a pressure release port 41 therein which extends to the exterior of the structure and is closed by a pressure relief valve 42, operatively communicating over a line 42' with the line 8 to the reservoir 3. The tertiary unit is also provided with a pressure gauge 43 and an air venting valve 44, both of which are mounted on the top 33 in communication with the housing interior. As illustrated, the lines 8 and 12 are connected by a T-connection with the common line 45 extending into the trough member 37, whereby liquid entering the lines 8 or 12, as determined by the operating positions of the valves V2 and V3 is taken from substantially the extreme top of the housing 31. The trough member 37 may be supported, for example, in addition to the support provided by the outlets 41 and 45, by a plurality of blocks 36' rigidly mounted on the adjacent side walls of the member 32.

As illustrated in FIGS. 2 and 3, extending across the housing 31 adjacent the bottom 34 thereof is a partition wall 46, forming a chamber 47 at the bottom of the structure. As illustrated in such figures, as well as in FIG. 7, the lines 7 and 11 are connected to a common inlet pipe 48 for discharging liquid in either of the lines 7 or 11 into the chamber 47. A baffle member or plate 49, suitably supported by legs or the like from the bottom 34, extends above and across the inlet opening 48' of the pipe 48, thus preventing direct discharge of liquid against the partition wall 46 and effectively distributing flow throughout the chamber.

The wall 46 is provided with a plurality of jets, indicated generally by the numeral 50, a preferred embodiment of which is illustrated in FIG. 8.

In this construction the jet comprises an externally threaded shank member 51 adapted to be threaded into the supporting wall or plate 46 and secured in operating position by a lock nut 52 threaded on the shank 51. Disposed at the opposite face of the wall 46 and encircling the adjacent end of the shank 51 is a disk member 53 formed, for example, from sheet metal and provided with a downwardly extending peripheral flange 54. Formed in the flange are a plurality of notches 55, the construction illustrated employing six such notches, which open on the free-peripheral edge of the flange, with the intermediate portions of the latter seated on the adjacent face of the wall 46. The latter thus cooperates with the notches in the flange to define openings adapted to discharge liquid on and along the adjacent face of the wall 46. As illustrated, the shank is of hollow construction having a bore 56 therein, with the side walls of the shank adjacent the member 53 having one or more ports or openings 57 therein whereby liquid may flow from the interior of the shank outwardly into the chamber, defined by the member 53 and the wall 46, with such liquid thus being discharged through the slots 55. If desired the bottom end of the shank 51 may be provided with similar openings 57' for the ingress of liquid and/or air into the jet structure, and as illustrated may be beveled at its lower end.

The modified jet structure illustrated in FIG. 9, comprises a hollow or tubular shank 51, likewise provided with screw threads on its exterior face, with such shank extending through cooperable opening 46' in the plate 46 and engaged with mating threads formed on the side defining the opening and locked in position by lock nut 52. The upper end of each jet is provided with an enlarged integrally formed head 53', which, for example, may have a hexagonal or octagonal peripheral configuration, that illustrated being provided with six side walls 54'. The head 53' is provided with a plurality of radially extending bores 57" which communicate at their inner ends in the bore 56 of the shank 51' and at their outer ends open on a respective wall 54', whereby in the example illustrated, six such bores are provided. The head 53' is also provided with a like number of bores 58, the axes of which extend substantially parallel of the shank 51' with the upper ends of each of such bores intersecting an associated bore 57", and the lower ends of each of such bores opening on the annular shaped bottom wall 59 of the head.

Disposed in the intermediate portion of the tertiary unit and extending, for example, from the wall 46 to somewhat above the grid 35 is a plurality of layers, L1–L5, of filtering and adsorption materials. In the specific embodiment illustrated, there are provided a plurality of layers L1–L4 of mineral, for example red flint, the layers being graded in size with the largest at the bottom and the smallest at the top, which layers form a filtration bed, on the top of which is disposed an adsorption layer L5 comprising a hydraulic mix of activated carbon and quartz, details of which will be subsequently discussed under the head "Operating Parameters".

STORAGE SYSTEM FOR RENOVATING WATER

FIGS. 3 and 6 also illustrate schematically details of the storage system for the renovated water to be utilized in the regeneration of the system.

As illustrated, the reservoir 3 comprises a generally rectangular tank 61 adapted to receive the effluent from the tertiary treatment unit 2 over the supply line 8, excess effluent, following filling of the tank 61 to a desired level, being discharged through the outlet line 9 communicating with the tank. The line 11 for conducting renovated water from the tank 61 to the chamber 47 of tertiary unit is operatively connected with the discharge side of the submersed pump P4 in the tank 61, the inlet of which pump opens on the tank interior. The pump P4 may include a self-contained float switch, or the like, for deenergizing the pump when the liquid level in the tank drops to a predetermined level.

The tank 61 is also provided with an electrical heating unit, indicated generally by the reference numeral 62, (FIG. 6) through which renovated water in the tank is adapted to be circulated by means of a suitable pump P5 having its inlet opening communicating with the lower portion of the tank and its discharge opening connected by a line 63 to heating unit 62 with the renovated water, following passage through the heating unit being discharged through the outlet pipe 64 thereof. Thus by actuation of the heating element 62 and operation of the pump P5 the renovated water in the tank 61 may be brought up to a suitable temperature, for use in connection with the reactivation or regeneration of the material of the tertiary treatment system.

TERTIARY REGENERATION

In the embodiment of the invention illustrated, the tertiary structure 2 is adapted to have the filter and adsorption beds L1–L5 thereof periodically regenerated, for example between each pump down cycle from the primary-secondary structure. Such regneration is effected by the use of a regenerating gas, for example air under pressure, and water, with the latter preferably being suitably heated. Where air is employed, such air may be supplied from a compressor C1, having suitable capacity as to volume of air and pressure, while the water, employed at least in part as a flushing medium preferably makes use of renovated water which is accumulated, preferably heated, and stored, until time of use, in the reservoir 3.

As previously described with respect to the tertiary unit, the air line 13 from the compressor C1 is operatively connected with the inlet 48 of the tertiary unit over a check valve CV3, which permits passage of air through the line 13 but prevents a reverse flow of water therein when air is not being supplied to the unit. Likewise, the water from the tank 61 is supplied to the tertiary inlet over line 11 and check valve CV2, with the rate of flow through the line 11 being determined by the setting of the manual flow-control valve FV5. As hereinafter discussed in detail under the heading "Operating Parameters", while the flow of air and water through the tertiary unit may be variously selected, excellent results have been obtained when only air in suitable volume and under suitable pressure is initially passed through the tertiary unit for a predetermined period, followed by a combined flow of air and water therethrough, and finally by a flush with water only.

In general, the volume, pressure and duration of the air flow during the initial flow of only air should be such that the beds of the tertiary unit will be expanded sufficiently to insure satisfactory exposure of all particles of the beds to the regenerative action of the air and water, but insufficient to materially effect the layer distribution of such particles. It will also be noted that a chamber is provided above beds, i.e. between the top of the adsorption bed and top 33, forming what might be termed a "regeneration chamber" in which the material is renewed by subjection to the oxidizing action of the air and water.

After passing through the tertiary unit materials with entrained purging air and water is returned to the primary-secondary chamber 21 over valve V3 and line 12. It will be appreciated that the regenerating operation must fully remove all material accumulated in the tertiary unit, as a result of the filtration and adsorption processes, with sufficient flushing water being employed to insure that the effluent at the discharge side of the tertiary unit, after regeneration, is of the same quality as the normal output effluent from the system, i.e, that all impurities are effectively removed from the tertiary unit during the regenerating process. If this were not the case, the regenerating cycle being insufficient to fully purge the system, a build-up would take place in the tertiary unit necessitating periodic shutdown and cleaning or replacing of the materials.

In review, the regenerating water flow thus takes place during operation of the pump P4, with the flow of water being controlled by the flow valve FV5, the water passing over line 11 and check valve CV2 into the tertiary unit and discharged therefrom over line 12 and valve V3 to the primary-secondary unit.

It will thus be appreciated that the regeneration cycle is, in effect, a reflex operation in which the purged materials are recycled and thus further reacted upon biologically in the primary-secondary treatment.

CYCLIC OPERATION OF THE SYSTEM

As previously generally described, the system may be operated in cyclic manner, for example, in repetitious cycles of 24 hours each with the operations being coordinated with the normal use of the system.

A typical, and believed preferably cycle of operation for use with the system illustrated is diagrammatically presented in FIG. 10. In this figure the cycle is graphically illustrated, for convenience as a straight line chart, vertically orientated but it will be appreciated that it would be more accurately depicted as a closed circle with the top and bottom lines, representing 12:00 A.M., superimposed.

Referring to the chart, it will be noted that from approximately 5:40 A.M. to the following 2 A.M., a period of 20 hours, 20 minutes, aeration takes place in the primary-secondary chamber 21, during which time approximately 500 gallons of incoming sewage may be received into the chamber over the line 4, valve VI in such line being open to permit such operation. Valves V2 and V3 are motorized units and preferably are wired for simultaneous operation with ports being reversed, i.e. V2 open when V3 closed and vice versa. Consequently, the valves will be set from the last pump-down cycle, i.e. V2 open and V3 closed. During this operation, pump P1 is inoperable so that no effluent will flow from the primary-secondary chamber to the tertiary unit 2, although valve V2 is open and valve V3 closed. From approximately 5:40 A.M. to 1:00 A.M., the heater 62 will be energized and the circulating pump P5 actuated (it being assumed that an intermediate cycle of operation is involved in which the reservoir 3 has been filled with renovated water during the preceding cycle.)

Thus referring to the diagram, at 5:40 A.M. incoming sewage may discharge through valve V1 and line 4 into the primary-secondary chamber 21, and simultaneously therewith blower B will be actuated to supply aeration in such chamber, heating unit 62 will be energized and circulating pump P5 actuated to effect a circulation and heating of water in the tank 61.

At the following 12:00 A.M. feeding of chemicals to the primary-secondary chamber 21 may take place over pump P3 and lines 10 and 10b, such chemical feeding taking place in the example illustrated for a period of approximately five minutes, i.e. to 12:05 A.M.

Heating of the renovated water in the reservoir 3 continues to take place until 1:00 A.M. At this point valve V3 is opened, valve V2 closed, and compressor C1 actuated whereby air will flow in line 13, through check valve CV3 and discharge ring 60 into the chamber 47, with such air flow being at suitable volume, suitable pressure and for suitable duration, as hereinafter discussed under the heading "Operating Parameters". Such air will tend to lift or expand the filtration and adsorbent beds in the tertiary unit, with excessive movement of the bed materials being prevented by the grid 35. However, the air will sufficiently expand the beds as to insure a permeation of air and subsequent water flow throughout the bed structure, resulting in a regenerating, oxidizing action of all materials accumulated therein. At the end of the initial air regeneration phase the pump P4 will be actuated, operative to pump the heated water through line 11, flow valve FV5 and check valve CV2 into the chamber 47 of the tertiary unit, up through the filtration adn adsorption beds along with the continued air flow, and discharged through the valve V3 and line 12 into the primary-secondary chamber. The combined air-water flow will continue for a predetermined period, followed by predetermined period of only water flow, sufficient to insure a complete flushing of the tertiary unit whereby the flushing water discharged at the end of the regeneration period will be of equal quality with the normal output effluent from the system. In the example illustrated in FIG. 10, the regeneration period, illustrated in exaggerated form, may be approximately 20 minutes, with the air and water discharged from the tertiary unit likewise being returned over the valve V3 and line 12 to the primary-secondary unit. At the end of the regeneration cycle, i.e. approximately 1:25 pump P4 is deactuated, for example by an internal float-switch incorporated therewith.

Aeration continues to take place, in the example illustrated, until 2:00 A.M. until which time the blower B is deactuated and valve V1 closed. Any incoming sewage thereafter is retained in holding tank 6 while a secondary settling period takes place in the chamber 21. This continues, in the example illustrated, for a period of 3 hours until 5:00 A.M. at which time valve V2 is opened, valve V3 closed and pump P1 in the chamber 21 actuated, thereby pumping effluent in the chamber 21 through line 7, check valve CV1 and flow control valve FV1 into the tertiary unit, with the effluent from the latter being discharged through line 8 and open valve V2 into the tank 61 for renovated water. When the water in the latter reaches its original level any excess thereover will be discharged through the line 9 and may be utilized for any suitable purpose, or collected in a suitable holding tank for subsequent use. Simultaneously, with the actuation of the pump P1, the pump P2 is actuated to feed chemicals through lines 10 and 10a to line 7 so that additional chemicals are supplied to the effluent being conducted to the tertiary unit. In this case, the feed of chemicals into the line 7 will be proportionate to the effluent flow so that the pump P2 will be actuated throughout the period of actuation of the pump P1.

At the end of the pump-down phase the valve V1 will be opened, permitting discharge of any accumulated sewage in the tank 6 to enter the primary-secondary chamber 21 and any subsequent sewage flow to pass directly into such chamber. Likewise, the heating unit 62 in tank 61 will be energized and circulating pump P5 actuated to begin the renovated water heating phase. Simultaneously with the latter, the blower B will be actuated, thereby again initiating aeration in the primary-secondary chamber 21, with aerobic-chemical oxidation continuing for the remainder of such new phase, i.e. until the next settling phase. The apparatus thus starts the repetition of another 24-hour cycle of operation.

It will be appreciated that the operation may be continuously automatic requiring no manual attention whatsoever, the only maintenance being required being that of periodically replenishing the supply of chemicals in the tank CS. The chemical materials may be so produced that the tank CS will be adequate for at least between 30 and 60 days operation of the system, so that suitable maintenance programs may be readily supplied to the purchaser of such a unit.

CHEMICAL TREATMENT

The general method employed and apparatus utilized in the practice thereof, together with the mechanical operation of such apparatus has been previously discussed. The chemicals and chemical treatment employed in the practice of the invention will now be described.

However, before discussing such chemical treatment, it is believed desirable to briefly review the chemical materials, procedures and concepts involved in known treatments of raw water and sewage.

The use of coagulants in water purification has been a standard procedure for many years, the reaction with the coagulant to produce the desired floc in the purification of raw water often, where feasible, making use of the natural alkalinity of the water to produce the desired floc. The desirability of control of pH has been recognized over the years and where necessary additional acidic or alkaline materials have been added in an effort to effect a control of pH to the value most suitable for flocculation.

However, in the past, the teaching with respect to sewage treatment and the use of coagulants has quite consistently been that the coagulant and alkali should not be premixed but should be added in separate stages to avoid the addition of prereacted floc to the sewage, and it has been stated that in such case both colloid and color removal will be substantially nil. It, therefore, has been deemed essential to separately introduce the coagulant and alkali in separate vessels whereby the actual formation of floc would take place in the main body of water.

More recently, the importance of zeta potential also has been rcognized and in particular, the necessity of having the zeta potential in the vicinity of zero, particularly −5 to +5 if optimum flocculation is to be achieved.

In recent years with the high use of detergents and the like containing phosphates, the problem of phosphate removal has also increased in importance, and adequate reduction of the phosphate content in sewage water must also be taken into consideration.

Likewise, polyelectrolyte coagulant aids have more recently been employed in connection with water clarification processes and in generally, involve electrolytic activity although the terms as currently used includes naturally occurring organic flocculants, many of which function solely through hydration. Polyelectrolytes may be classified as anionic, cationic or non-ionic in dependence upon the charges appearing in solution, non-ionic having both positive and negative charges present. At the present time the mechanisms of such aids are not completely understood and are currently undergoing extensive research. It would appear that the most dependable tool in studying and determining coagulation processes and efficiency is still the well-known jar test, which might be deemed "trial and error" tests, i.e., empirical studies as distinguished from theoretical or calculated studies.

While the overall results of the present invention involve a combination of steps, purely physical, as well as biological-chemical treatment, etc., the success of the invention is also the result of what may be deemed and is believed to be a major breakthrough in water purification processes with respect to the physio-chemical concepts involved and the ability to provide a single chemical material having all necessary chemicals in proper proportion to achieve the desired results. The invention thus enables the practice of an extremely simple chemical treatment to complement the extremely simple physical processes employed, utilizing corresponding relatively extremely simple physical structures, which for example, may employ merely two stages, i.e., two vessels, one involving the primary and secondary treatment and the other the tertiary treatment as distinguished from the customary practice of employing a relatively large number of vessels each having a respective function and usually involving its own operational and chemical steps. The ability to employ a single chemical material also contributes to the objective of producing a completely automatic system requiring no monitoring thereof and thus no attendant personnel.

The present invention also demonstrates the complete feasibility of introducing prereacted floc to sewage, i.e., the resultant of an aqueous mixture of suitable coagulant and alkaline material reacting therewith, or the equivalent thereof, to produce the desired floc, with the material of the present invention also including, if desirable, material for phosphate removal, and an agglomeration-promoting material such as a suitable polyelectrolyte.

The material of the present invention thus involves, at time of use, an aqueous mixture of a plurality of functional materials, i.e., a coagulant and an alkaline material reactive therewith to produce a floc, or its equivalent, an agglomeration-promoting material, and a phosphate precipitating material, with the floc thus being, in effect, prereacted in the mixture prior to introduction into the receiving effluent.

It will be appreciated that the specific proportions of the various materials will, of necessity, depend upon the character of the sewage being treated, and the broad range of amounts of the respective materials must be generally established in terms of their functions in the sewage in which they are introduced. It is believed apparent that in substantially any system, te amounts of phosphates, suspended solids and colloidal material as well as the pH range, will tend to approach normal or average values for the specific system, as well as relatively readily ascertainable peak levels, from which figures the necessary quantities of the most suitable chemical materials may be relatively easily initially estimated or computed, following which physical tests may be run to provide a final check out of the selected proportions and insure optimum results.

Likewise it will be appreciated that as the material involves an aqueous mixture, the amounts of the various components may be simply resolved in terms of amounts per liter of effluent to be treated.

It will also be apparent that while, in many instances, it may be preferable to employ the same material for both phosphate removal and the formation of floc, another suitable material could be employed for phosphate removal, particularly where a predetermined adjustment of pH is involved. However, from a practical matter the use, where possible, of the same material for both simplifies the preparation, enabling the purchase of only the one material, in greater quantities, and possibly lower cost, and further, may involve less complex reactions.

The proportions, assuming the use of the same material for both phosphate removal and floc formation, may be generally set forth as follows: the coagulant will be initially present in an amount sufficient for reaction with all of the reactionable phosphates present in such water, i.e. those capable of being precipitated out of solution. In addition, a further amount of coagulant is provided to supply sufficient floc for the efficient removal of substantially all suspended and colloidal material in the sewage, and where required, the alkaline material would initially be present in an amount sufficient to react with such further amount of coagulant adapted to provide a pre-reacted floc. The agglomeration-promoting material should be present merely in an amount sufficient to insure the desired improved agglomeration.

The respective totals of each of such materials may be limited to substantially that providing reasonable excesses thereof consistent with insuring the presence of adequate amounts thereof to accomplish the respective specified purposes as too much chemicals can produce adverse affects, particularly among other with respect to pH and zeta potential.

The invention thus enables the practice of a very simple method of chemically treating water, particularly that containing sewage wastes, in connection with the purification thereof, and in particular the removal of phosphates and suspended and colloidal materials, in which the coagulant and any required alkaline reactive material are, in effect, simultaneously introduced into the effluent, along with the agglomeration promoting material, with the proportions of the respective materials thus being sufficient to remove substantially all reactionable phosphates present in the water, together with the removal of all suspended and colloidal material by means of the floc provided, and very effective and rapid agglomeration being achieved by the inclusion of the agglomeration-promoting material, following which the precipitated and agglomerated materials may thereafter be removed from the effluent, for example, by settling, filtration and adsorption steps.

As previously mentioned, considerable work has heretofore been done in connection with polyelectrolytes and it is believed that it is unnecessary to go into a detailed discussion with respect thereto. However, while it is possible that other polyelectrolytes may be employed, we have found that excellent results can be achieved by the use of a synthetic, high molecular weight (1 million and up) acrylamide copolymer. Such polyacrylamide, which is essentially non-ionic in solution, has a formula, the general structure of which is as follows

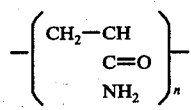

The polyacrylamide is essentially non-ionic in solutions because of the preponderance of amide groups, although a small portion of the amide groups are usually hydrolyzed to anionic carboxyl groupings. As herein utilized, the polyacrylamide results in the formation of strong bonds when the colloidal floc is adsorbed on the mixed bed of the tertiary adsorption filter.

The exact mechanism of such bridging action is unknown, but is suspected to be a chemical reaction. It has been found to be particularly effective when operating with a zeta potential between $-5$ to $-13$, and when operation at 0 to $-5$ zeta potential the polyelectrolyte makes up for deficiencies due to rapidly changing sewage conditions. Color bodies would appear to be best adsorbed and filtered at 0 ZP with properly designed filter adsorption media such as herein provided. Liquid-solid adsorption techniques within the Gibbs theoretical approach (particularly those of high suspended solids content) is of greatest importance in sewage treatment processes. The range of strong agglomeration, precipitation and filtration takes place at a zeta potential $+5$. The zeta potential, and thus the colloid stability of electrostatic colloids is a function of the valence, type and concentration thereof. Consequently, as the polyacrylamide is non-ionic it will not effect the zeta potential and will thus permit the same to remain at an effective value.

As previously mentioned, conceivably, dependent upon operating conditions and the end results desired or tolerable, coagulants and reactive materials commonly employed, i.e. sodium aluminate, sulphates of aluminum and iron, and ferric chloride may be employed, together with a suitable alkaline reactive material for those other than the aluminate, at least in accordance with some of the features of the invention. Consequently as the aluminum compounds, i.e. sodium aluminate and aluminum sulphate appear to offer the greatest advantages over the others, eliminating possible complications with respect to color in the final effluent and other problems with respect to pH control and zeta potential, as well as achieving relatively poor results particularly with respect to excessive and intolerably increasing agglomeration times required, and possibly complicating the chemical reactions, sodium aluminate and aluminum sulphate present the least problems and provide the greatest universality of use, in view of which the others may in most cases advantageously be dropped from consideration. In particular it would appear that the aluminum compounds are especially suitable for supplying the desired floc and thus it would appear that substitution of the other coagulants would preferably be limited to inclusion for phosphate precipitation. Again, in this connection, it should be kept in mind that the use of an iron salt may involve resoluble ionization through anaerobic digestion, particularly ferrous sulphate, and it would appear that of this group ferric chloride probably is preferable. Likewise, if phosphate removal, color and long agglomeration times are not of major importance, such coagulants might be employed, at least as a part of the supply of prereacted floc. It would, however, appear desirable, if not necessary in most applications utilizing the type of apparatus illustrated, for the achievement of the desired substantially instantaneous flocculation and agglomeration, to employ at least a percentage of aluminum sulphate or sodium aluminate. Consequently, it would appear to be the most simple and efficient solution to normally limit use to either or both of these materials.

Again, consideration of the effect on the pH must be taken into consideration, to insure that the selected combination of materials will not adversely affect the pH. While pH at least theoretically could be corrected by the addition of suitable correcting agents, obviously, in most cases it will be preferable to employ a coagulant which will have a beneficial effect on the pH without the necessity of adding additional materials solely for such correction.

In this connection, studies have been made with the common flocculents and if necessary, cooperable alkaline reactive agents, to determine the most effective materials for use in the practice of the invention, specifically alum $(Al_2)SO4)_3 \cdot 14H_2O)$, sodium aluminate $(Na_2Al_2O_4)$, ferrous sulphate $(FeSO_4 \cdot 7H_2O)$, ferric sulphate $(Fe_2(SO_4)_3)$, and ferric chloride $(FeCl_3)$ x. In addition, with the exception of sodium aluminate, an alkaline reactive agent is normally employed with the others, alum usually involving the use of calcium bicarbonate $(Ca(HCO_3)_2)$, sodium carbonate $(Na_2CO_3)$ or calcium hydroxide $(Ca(OH_2))$; calcium hydroxide with ferrous sulphate; and calcium bicarbonate or calcium hydroxide with ferric sulfate or ferric chloride.

On the basis of such studies it is believed that the aluminum compounds are preferable over the others for the following reasons:

1. The aluminum ion is colorless and its compounds are usually white, whereas ferric and ferrous ions of yellow and green, respectively, form colored compounds.
2. Aluminum presents no interference with biological nitrification or carbon and solids removal.
3. Mixed sludge presents better settling characteristics in the mixed liquor than either biological sludge or aluminum hydroxide floc alone.
4. Aluminum phosphate precipitate resins its identity through anaerobic digestion and is not resolubilized, i.e. reduced supernatant phosphorous recycle, as phosphorous is not released from aluminum precipitate during anaerobic digestion.
5. Relative ease of handling and mixing of materials, as well as stability thereof.

6. Use of alum and alkaline agent, and/or sodium aluminate provides simple control of pH, eliminating use of additional materials therefor, and simultaneously provides the same metal ion.
7. Enables use of minimum number of material with greater quantity and less cost.
8. Iron compounds are most effective for phosphorous removal at the undesirable low pH of 4.5 to 5.0 for ferric compounds, and the undesirable high pH of 8 for ferrous compounds, while aluminum compounds perform effectively closer to 7. The use of aluminum compounds thus enables effective control of pH and zeta potential without the use of additional materials, included solely to adjust the pH.
9. The aluminum compounds provide large surface area of the chemical-biological floc, for effective adsorption to the floc surface and coagulation of fine precipitated particles.

In view of the above, detailed discussion of chemical materials, and the amounts thereof in the practice of the present invention, will be limited to the two most preferable, aluminum sulphate and sodium aluminate, and where aluminum sulphate is employed as the floc-forming coagulant, sodium carbonate (soda ash) will be employed, illustratively, as the alkaline reactive agent (particularly for ease in handling). Likewise, amounts will be based on a plant having approximately 500 gal./day capacity with non-industrial raw sewage having an approximate constituent composition range as follows:

Table 1

| Constituent | Concentration mg/l |
|---|---|
| BOD$_5$ – 20° C | 115 – 425 |
| pH | 6.7 – 7.6 |
| Suspended solids | 165 – 895 |
| Settleable solids ml/l/hr. | 10 – 20 |
| Phosphorous as PO$_4$ | 12 – 18 |

Based upon such a system and sewage composition, utilizing aluminum sulphate and soda ash, with the total amounts being introduced into the effluent in the manner previously described excellent results have been obtained with the following proportions:

| Aluminum sulfate | 250 mg/l |
|---|---|
| Soda ash | 120 mg/l |
| Polyelectrolyte | 1 mg/l |

As previously mentioned, preferably a portion of the chemicals are introduced into the primary-secondary chamber 21, preferably just before the initiation of the settling period with the remaining quantity being injected during the pump-down cycle.

Studies have indicated that for a system of this capacity with average, non-industrial sewage, the proportions of the chemical constituents would normally range between the following dependent of course on the character of the sewage:

| Aluminum sulphate | 200 mg/l to 350 mg/l |
|---|---|
| Soda ash | 90 mg/l to 150 mg/l |
| Polyelectrolyte | 0.5 mg/l to 10 mg/l |

In the event that a low initial pH of the sewage is involved, it would normally be desirable to employ sodium aluminate instead of the aluminum sulphate for at least a part of the latter, in which case the overall ranges would be as follows, (keeping in mind that the proportions of sulphate and aluminate would vary inversely and that the presence of soda ash would vary in accordance with the amount of sulphate utilized for floc formation):

| Aluminum sulphate | 0 – 350 mg/l |
|---|---|
| Soda ash | 0 – 150 mg/l |
| Sodium aluminate | 150 – 0 mg/l |
| Polyacrylamide | 0.5 – 10 mg/l |

Where no aluminum sulphate is employed, excellent results have been obtained with effluent having a pH on the order of approximately 5.5 with the following:

| Sodium aluminate | 100 mg/l |
|---|---|
| Polyacrylamide | 1 mg/l |

Where intermediate pH values are employed, various combinations employing both aluminum sulphate and sodium aluminate have proved effective. FIG. 11 is a graph illustrating in line $a$ the effect of various combinations of the two coagulants, together with curve $b$ for sodium aluminate alone. Superimposed on this graph is a line $c$ representing the relative effect of aluminum sulphate, soda ash and polyacrylamide, without sodium aluminate. The latter curve of course is not plotted on the abscissa in parts of sodium aluminate, but rather, theoretically in parts of aluminum sulphate. It is intended to show merely that with an initial pH between 6.5 and 7, the combination of alum 250 mg/l, soda ash 120 mg/l and polyelectrolyte 1 mg/l, the pH is raised to between 7 and 7.1.

The curve for the combination of both aluminum salts is reasonably accurate for ranges of alum between 25 to 150 mg/l, soda ash between 10 to 75 mg/l, and polyelectrolyte of 1 mg/l.

No need is seen to include specific amounts when other alkaline reactive agents are employed as, in general, equivalent mole amounts thereof may be substituted for the sodium carbonate.

While the other coagulants are usable in varying degrees and under varying conditions, their effectiveness, as compared with aluminum salts, is such as to make it practical to rely on the latter. It would appear that the use of the other coagulants is primarily dependent upon special cases involving unusual combinations of pH and waste contaminants, but where any of the disadvantages, previously discussed, are not critical, i.e. color, undesirable optimum pH, resolubility, long period for flocculation, etc., some of the advantages of the present invention may be derived by their use, provided the conditions are such that the desired pH and zeta potential controls are achieved when the components are present in suitable quantities to provide adequate floc and phosphate precipitation. No figures can be given in this respect as substantially every situation will have to be resolved on its own facts and conditions. It might be mentioned, however, that by proper selection of materials, together with additions of aluminum coagulants, a suitable pH control, etc. may, in at least some cases, be effected. However, if this is necessary, it would appear much more advantageous to initially employ the aluminum coagulants.

EXAMPLES OF CHEMICAL MATERIALS

As a basis for use of such materials the following examples are given, primarily on the basis of flocculation, without consideration of all the variables previously discussed as to pH, zeta potential, phosphate removal and resolubility, or possible disadvantages with respect to color, show flocculation, etc. In general iron salts, when utilized without additional aluminum salts, provide such slow flocculation that from a practical standpoint consideration of their use in conjunction with the present type of system may be limited to a discussion of combinations with such aluminum salts.

All of the examples utilized a polyacrylamide and secondary effluent for the test sewage, having the following composition:

| 1) | Total solids | 1310 mg/l |
|---|---|---|
| 2) | Settlement solids ml/1/hr | Trace |
| 3) | Suspended solids | 12.0 mg/l |
| 4) | pH value | 6.4 |
| 5) | $BOD_5$, 20° C | 15. |
| 6) | Total Phosphate | 20 mg/l |
| 7) | Turbidity J.T.U. | 17. |
| 8) | Alkalinity, Total as $CaCO_3$ | 10. mg/l |

EXAMPLE 1

| $FeSO_4 \cdot 7H_2O$ | 197.5 | mg/l |
|---|---|---|
| $Ca(OH)_2$ | 52.5 | mg/l |
| $Na_2Al_2O_4 \cdot 3H_2O$ | 50.0 | mg/l |
| Polyelectrolyte | 1.0 | mg/l |

Results:
1. Relatively thin floc formed in first two minutes, thereafter started to settle.
2. Orange colored precipitate.
b 3. Final pH 7.2 – 7.3

EXAMPLE 2

| $Fe_2(SO_4)_3 \cdot 2H_2O$ | 67 | mg/l |
|---|---|---|
| $Ca(OA)_2$ | 33.4 | mg/l |
| $Al_2(SO_4)_3 \cdot 14H_2O$ | 100. | mg/l |
| Polyelectrolyte | 1. | mg/l |

Results:
1. Relatively thin floc formed in two minutes, thereafter started to settle.
2. Orange-yellow colored precipitate.
3. Final pH - 6.0–6.1

EXAMPLE 3

| $Fe_2(SO_4)_3 \cdot 2H_2O$ | 67 | mg/l |
|---|---|---|
| $Ca(OH)_2$ | 33.4 | mg/l |
| $Al_2(SO4)_3 \cdot 14H_2O$ | 100. | mg/l |
| Polyelectrolyte | 1. | mg/l |

Results:
1. Relatively thin floc formed in two minutes, thereafter started to settle.
2. Orange-yellow colored precipitate.
3. Final pH - 6.0–6.1

EXAMPLE 4

| $FeCl_3 \cdot 6 H_2O$ | 107 | mg/l |
|---|---|---|
| $Ca(OH)_2$ | 43 | mg/l |
| Polyelectrolyte | 1 | mg/l |

Results:
1. Relatively thin floc formed in two minutes, thereafter started to settle.
2. Pale-yellow colored precipitate.
3. Final pH 5.9

EXAMPLE 5

| $FeCl_3 \cdot 6H_2O$ | 107 | mg/l |
|---|---|---|
| $Ca(OH)_2$ | 43 | mg/l |
| $Na_2Al_2O_4 \cdot 3H_2O$ | 50 | mg/l |
| Polyelectrolyte | 1 | mg/l |

Results:
1. Floc formed in one to two minutes, thereafter started to settle.
2. Pale-yellow colored floc.
3. Final pH 7.1

The following examples of various combinations of aluminum salts and/or alkaline reactive agents are presented for illustration and comparison, if desired, with the above examples.

EXAMPLE 6

| $Na_2Al_2O_4 \cdot 3H_2O$ | 100. | mg/l |
|---|---|---|
| Polyelectrolyte | 1. | mg/l |

Results:
1. Floc formed in less than one minute, grew in size in next minute and thereafter started to settle.
2. No color.
3. Final pH 7.7.

EXAMPLE 7

| $Al_2(SO_4)_3 \cdot 14 H_2O$ | 250. | mg/l |
|---|---|---|
| $NaOH$ | 100. | mg/l |
| Polyelectrolyte | 1. | mg/l |

Results:
1. Floc formed in one minute, started to settle in next minute.
2. No color.
3. Final pH 6.9–7.0

EXAMPLE 8

| $Na_2Al_2O_3 \cdot 3 H_2O$ | 50. | mg/l |
|---|---|---|
| $Al_2(SO_4)_3 \cdot 14 H_2O$ | 50. | mg/l |

Results:
1. Floc formed in one to two minutes, thereafter started to settle.
2. No color.
3. Final pH 6.6–6.7

EXAMPLE 9

| $Al_2(SO_4)_3 \cdot 14 H_2O$ | 250. | mg/l |
|---|---|---|
| $Ca(OH)_2$ | 100. | mg/l |
| Polyelectrolyte | 1. | mg/l |

Results:
1. Floc formed in one minute started settling in next minute.
2. Floc size and settling rate good.
3. No color.
4. Final pH 6.5 – 6.6

The following tabulated examples illustrate pH control utilizing various combinations of aluminum salts, employing the same sample effluent as the previous examples but with pH previously adjusted to 5.5, and illustrate the control of pH with different proportions of such salts.

EXAMPLE 10

|  | Conc. mg/l | | | |
|---|---|---|---|---|
| $Al_2(SO_4)_3 \cdot 14 A_2O$ | 25 | 50 | 100 | 150 |
| $Na_2CO_3$ | 10 | 25 | 50 | 75 |
| Polyelectrolyte | 1.0 | 1.0 | 1.0 | 1.0 |
|  | pH values | | | |
| Final pH with 50 mg/l | 6.5 | 6.5 | 6.5 | 6.5 |
| following additions of 100 mg/l | 6.8 | 6.7 | 6.7 | 6.8 |
| $Na_2Al_2O_4 \cdot 3H_2O$ 150 mg/l | 7.3 | 7.3 | 7.3 | 7.3 |

Cumulative Results:
1. Floc formed in first thirty seconds to one minute, grew in size and settled in one to two minutes.
2. No color.
3. Most floc settled in three to five minutes.

While examples of iron sulphate omitting aluminum salts, have not been illustrated, as their characteristics would normally permit use primarily in extremely limited situations, it is believed that the expert in the field would have no difficulty, in the light of the present teachings to resolve their use in such situations. However, calculated compositions should be confirmed by empirical studies, as is common practice in this field.

It might be mentioned that calcium hydroxide theoretically could be employed as the flocculant. Combinations of 100-250 l mg/1 with 1 mg/1 polyelectrolyte have proved very efficient from the standpoint of floc formation, and when introduced into effluent samples as initially set forth, resulted in very rapid floc formation and settling action but with a final pH of 8.2-8.5. However, as $PO_4$ removal is dependent on PH and lime requires an optimum pH of 9.5-11 for such removal, the use of line normally would not be practical for phosphate removal, as it would in all probability be necessary to initially adjust the pH upward, for example, by the addition of a large amount of lime, and then subsequently reduce the pH by an acidic agent to a suitable value for ultimate discharge.

PREPARATION OF CHEMICAL MATERIAL

As previously mentioned the chemical material, as used in the apparatus described, is an aqueous mixture of one or more coagulants, an alkaline material, if necessary, and a polyelectrolyte. In preparing the material, assuming that the system involved has a 500 gallon per day capacity, and the material is to supply 250 mg/l of alum, 120 mg./l soda ash and 1 mg/l polyelectrolyte, such quantities of material may be readily prepared, for example, to provide three liters of liquid material, whereby the supply to the effluent being treated would be at a proportional rate of 6 cc per gallon of effluent. To provide this ratio the three liters would contain 1.9 grams of polyelectrolyte, 1.05 pounds of alum and 0.455 pounds of soda ash.

The material may be readily prepared by taking two volumes of water the total of which is less than three liters and introducing the alum in one volume and the soda ash in the other, with the two solutions thus prepared being mixed together with an accompanying formation of floc. The polyelectrolyte is then introduced thereto and additional water added to bring the total to three liters. 6 cc of such material would then provide the desired amounts of alum, soda ash and polyelectrolyte per liter of effluent. The amount of water employed in the preparation of the material is not critical and preferably is kept as low as practical, consistent with bringing the respective constituents into solution, effect formation of the desired floc and enable suitable feeding. At the same time, it will be appreciated that as the chemicals are preferably supplied to the system in quantities to last a reasonably long period of time for example 30 to 60 days or more, it is advisable to keep the total amount of material to be stored at a minimum.

As the material contains prereacted floc, to insure feeding of uniform quantities thereof, the storage tank CS therefor preferably is provided with agitation means, as heretofore described, (comprising electric motor CS1 adapted to rotate the agitating blades CS2) to make sure that the injected volumes contain uniform quantities of components.

It has been found that a material having the proportions specified, and of such volume, provides an adequate aqueous vehicle for the floc and other components, the quantities to be fed being sufficiently large that reasonably accurate control thereof may be effected and at the same time preferably involve the use of less than one gallon of material per day. At the same time, the material is free flowing with a minimum tendency to clog the feed pumps or supply lines therefor. As the cost of the chemical materials is relatively inexpensive and comparatively small quantities are employed, the cost of the materials per gallon of effluent is well within practical values.

Likewise, where combinations of aluminate and sulphate are involved, they can, if desirable, be readily independently prepared and then suitably mixed together.

In accordance with another feature of the invention the chemical materials conveniently may be suitably processed in dry form and adapted to be combined with water just prior to use.

In this case, the respective materials are the form of dry discrete particles which may be placed in the desired proportions, in a suitable grinding apparatus, for example a ball or micro mill, and ground to a suitable particle size. That particularly suitable is one that will pass through a 325 U.S. standard screen, i.e. on the order of 40 microns. While the material may be individually ground and thereafter mixed, grinding of the mixture has the advantage of a combined operation.

The dry mixture so formed may be packaged, transported and handled in such form, and suitably mixed with water, at time of use, to provide the desired concentration.

Again, the use of sodium aluminate, aluminum sulphate and sodium carbonate would appear to offer the greatest advantage as to ease of handling, etc. in dry form as compared with other more highly corrosive or caustic materials.

OPERATIONAL PARAMETERS

A system constructed in accordance with the present invention presents relatively small physical dimensions, consideringthe results achieved, as compared with systems employing numerous tanks etc. and at the same time achieving poorer results. In a 500 gal/day capacity the overall area of the installation may be only 4 feet × 8 feet, with the primary-secondary chamber 21 having a height of 4.5 feet and the vertical column 14' having an area of 4 feet by 4.3 feet and a height or depth of 3 feet. Overall dimensions thus would be 4 feet wide, 8 feet long and 7.5 feet high. For comparison, a system having a 3125 gal/day capacity and capable of handling 50 persons would have corresponding overall dimenions of only 6 feet in width, 9 feet in height, and 14 feet in length, and a 12,500 gal/day capacity for at least 200 persons would have corresponding overall dimensions of 7½ feet × 11 feet × 28 feet. Obviously, in some cases it may be practical to install a plurality of units rather than one large unit.

In view of the fact, previously discussed, with respect to widely varying factors in the operation of this type of system, it is believed preferable to more or less limit specific parameters to the operation of the specific system illustrated, under average home conditions as distinguished from industrial conditions, from which one skilled in the art should have little difficulty in applying the teachings hereof to other conditions and applications. It is believed apparent, as previously mentioned with respect to the chemical materials, calculations and situations such as this cannot be resolved with mathematical precision and in many if not most cases mathematical concepts should be confirmed with empirical studies.

Suitable operational parameters (other than composition) of chemical materials, therefore will be discussed in connection with the system heretofore described, having an approximate operating capacity of 500 gals. per cycle of operation, i.e. for example 24-hour cycle, in which case the primary-secondary tank 20 could have an approximate volume of 800–850 gals. with approximately 200 –225 gals. residual being maintained in the tank at all times, i.e. normal total maximum content approximately 700–725 gals.

The blower B, in such case preferably should provide at least 18–15 CF at a head 35 inch – 40 inches of water. Calculations with respect thereto can be readily derived in accordance with present techniques and teachings with respect to aeration procedures, and conveniently, air may be supplied at 40 cubic feet per minute under such pressure, to provide a wide margin of safety and insure maximum aeration.

In the embodiment of the invention illustrated, again assuming that the primary-secondary tank has a capacity of 800–850 gals., the tertiary unit may be constructed, for example, with a bed area of 3 feet and adopted to contain a minimum of substantially 12 cubic feet of filter and adsorption materials in which embodiment five layers $L_1$ to $L_5$, with the layer $L_1$ comprising a 1 inch layer of red flint which would run from approximately ⅜ inches to ⅝ inches in size. Layer $L_2$ may comprise a 1 inch layer of red flint which would run from ½ inch to ¼ inch in size. Layer 3 may comprise 1½ layer of quartz 1.5 to 0.9 mm effective size (uniformity coefficient 1.75). Layer 4 may comprise a 2½ inch layer of quartz 0.5 to 0.3 mm effective size (U.C. 1.45).

The remaining layer $L_5$ may comprise a hydraulic mix of activated carbon and quartz with the particle sizes of carbon ranging from 1/11 inch to ¼ inch (4×10) mixed with #5 quartz with a uniformity coefficient of 1.45, and a height of approximately 3 to 4 ft.

The grid 35, with specific materials, such as that described, may be so constructed that the grid openings have minimum dimensions of from approximately ½ inch to ¾ inch, while the perforate portion 38' of the trough may be the equivalent of #16 mesh. It might be mentioned that while the carbon of the tertiary unit may contain some particles small enough to pass through the perforate portion into the primary-secondary chamber, this will do no harm as the fine carbon will provide extended surface therein, as has more or less recently become known, thereby improving performance.

The extended surface area of the fine carbon provides a bacterial breeding surface of large area, facilitating oxidation and thus improving efficiency of aeration. It may even be desirable in at least some cases to actually seed the primary-secondary with fine carbon.

It will be appreciated that with increase in the capacity of the system the capacity of the tertiary structure will also be correspondingly increased. This may be accomplished by increasing the area of the tertiary beds, increasing the height of the beds or a combination of both. In the first case the flow per unit of area may remain the same, and in the second the flow rate may be suitably increased. In any event the flow should be maintained at a rate that will insure that the layered structure of the beds is operatively maintained, i.e. the layered formation is not disrupted and with no liquid break-through.

Following the aeration cycle and settling cycle of from about 2.5 to 3 hours, the settled effluent is pumped through the tertiary column by means of the pump P1. With such physical parameters it has been found that very effective results can be achieved with a secondary effluent flow rate of between 2 and 3 gal/min./ft.$^2$ of bed area. Simultaneously with the flow in the tertiary structure, the chemical materials are injected into the secondary effluent line prior to entering the tertiary, and on the basis of a chemical mixture employing alum, soda ash and polyacrylamide with proportions, for example, being such as to provide 250 mg/l, 120 mg/l of soda ash and 1 mg/l of polyacrylamide, the acqueous mixture employed may, for example, have a concentration of materials such that 6 cc per gallon of secondary effluent will provide the desired mg/l concentration.

It has been found that best results are obtained when a portion of the desired amount of chemicals are added to the effluent in the primary-secondary tank 20, preferably prior to the settling operation, with the remainder being injected into the secondary effluent line during the pump-down cycle. Very advantageous results can be achieved by utilization of half of the desired quantity, i.e. 3 cc of chemicals per gal. in the primary-secondary tank, with the remaining 3 cc being injected in the secondary effluent line. As previously mentioned, the pumps P 2 and P 3 preferably are so constructed and operated that the requisite amounts of chemicals will be supplied at the desired times.

Studies, made with introduction of the chemicals taking place entirely in the primary-secondary tank, or all introduction taking place by injection into the secondary effluent line during pump-down, indicated that desired optimum results could not be achieved solely with either. In the case of supply solely to the tank, it was found that there was a tendency for the chemically treated settled secondary effluent to still contain some suspended solids and colloidal particles which required further chemical treatment. Likewise, as substantially instant agglomeration and flocculation must take place in the secondary effluent line, i.e. between the injection of the chemicals into the line and entry in the tertiary tank 22, optimum agglomeration of all of the prereact floc supply to the effluent normally would not take place in such short span of time. However, when the chemicals were divided, efficient agglomeration took place in the primary-secondary tank, and at the same time additional chemical injection into the tertiary line, resulted in a very efficient removal of any remaining suspended solids and colloidal particles, as the latter were readily picked up in the second stage agglomeration and effectively removed in the bottom portion of the tertiary structure which functions as a filtration media (as well as a support for the adsorption bed). Any remaining colloidal particles and dissolved organic solids were subsequently removed by adsorption on the surface of the activated carbon of the tertiary structure. It will be appreciated that the effluent flow through the tertiary unit can be readily controlled by means of the flow control valves FV1 nd FV2, which may be suitably adjustable or, where the system is designed for a specific application, may be permanently set valves adapted to provide the desired flow rate. The use of two flow control valves enables a flexibility and accuracy in the control.

While operating parameters with respect to regeneration of the tertiary unit may be varied, in dependence upon other design and operating parameters, it has been found that exceptionally efficient regeneration of the tertiary unit can be accomplished by the use of air at a pressure of from 10–30 psi with a flow rate of approximately 5–15 CFM in connection with the employment of water. In the system heretofore described, preferably such water is heated to 160°–170° to insure maximum effectiveness.

We have found that excellent results can be achieved by employing three seps, the first solely with air, the second a combination of air and hot water, and the third a flushing with water only. While obviously duration of each operation is subject to variation, particularly an extension of the duration thereof, it has been found that the following insures achievement of the desired results, providing adequate excesses of air and water and at the same time not unduly prolonging the operations. In the recommended procedure, the storage tank 61 may have a normal storage capacity of approximately 90 gals.

In a preferred regeneration cycle, air is passed through the tertiary unit at the specified volume and pressure for three minutes, and thereafter continued for another twelve minutes during which period hot water is simultaneously supplied at a flow rate of 5 gals. per minute (utilizing 60 gals.) and terminated with a flushing operation, utilizing only water, for a duration of 4 minutes (utilizing 20 gals.) whereby the regeneration cycle utilizes a total of 80 gals. of water.

In determining the parameters for the regeneration cycle it will be appreciated that the volume and pressure of the regenerating air (or gas) should be sufficient to adequately expand the filtration and adsorption beds to insure effective oxidation and flushing of all particles with hot water during the combined air-water operation at the same time without undesirably changing size distribution of the particles comprising the respective beds, i.e. disturb the operational arrangement and function of the respective layers of filtration and adsorption materials. Likewise, the amount of air (or gas) and water employed must be sufficient to insure adequate oxidation and flushing of the tertiary materials into the pirmary-secondary tank. The final 4-minutes of flushing insures that the water remaining in the tertiary unit at the end of the regenerating cycle will have the same purity as that therein prior to the preceding pump-down cycle. In this connection it should be kept in mind that as the tertiary unit is, to a large extent, filled with the filtration and adsorption materials, the net volume available for the retention of water is relatively low and is thus substantially fully supplied by the final flushing cycle.

RESULTS ACHIEVED BY THE PRESENT INVENTION

The following table represents actual results obtained in the operation of a 500-gal. treatment unit constructed and operated in accordance with the invention, and utilizing the methods and materials heretofore described. The chemical treatment in this particular case employed aluminum sulphate, proportioned in accordance with the teachings of the invention. The table is a comparison between raw sewage, secondary effluent before and after chemical treatment and the nature of the effluent discharged from the tertiary unit Table 2

| | | Conc. in mg/l | | | | |
|---|---|---|---|---|---|---|
| | | Secondary Effluent | | Tertiary Effluent | | |
| Constituent | Raw Sewage | Before Chemical Treatment | After Chemical Treatment | Low | High | Average Test |
| BOD$_5$ 20° C | 115–425 | 15–50 | 10–25 | 1.0 | 0.3 | 1.4 |
| pH | 6.7–7.6 | 6.3–7.7 | 6.5–7.5 | 6.9 | 7.1 | 7.0 |
| D.O. at 20° C | — | 4–7 | 4–7 | 5. | 7.5 | 6.7 |
| S.Solids | 165–895 | 5–136 | 8–20 | 0 | 2.0 | 0.6 |
| Settleable solids,mg/l/hr | 10–20 | trace | trace | 0 | 0 | 0 |
| Phosphorous as PO$_4$ | 12–18 | 8–13 | 6–10 | 0.3 | 4.0 | 1.57 |
| Nitrate as N | — | — | — | 10 | 15 | — |
| Turbidity, JTU | | 10–40 | 8–30 | 0.95 | 5 | 2.15 |

The results of operation for a period of over six months of a system embodying the invention may be set forth in a greater detail with respect to the character of the effluent discharged from the tertiary unit in the following table, in which the results are set forth in the form of the largest and smallest value ascertained, together with the average value (and the number of samplings on which the results were based).

Table 3

| | | Tertiary Effluent | | | |
|---|---|---|---|---|---|
| | | L | H | A | No. Tests |
| 1. | Temp. ° C at 9:00 A.M. | 10° | 21° | 14.8° | 50 |
| 2. | pH | 6.9 | 7.1 | 7.0 | 49 |
| 3. | D.O. at 20° C, mg/l | 5.0 | 7.5 | 6.7 | 47 |
| 4. | BOD$_5$ 20° C, mg/l | 1.0 | 3.0 | 1.4 | 27 |
| 5. | Settleable solids, ml/l/hr. | 0 | 0 | 0 | 50 |
| 6. | Suspended solids, mg/l | 0 | 2 | 0.6 | 42 |
| 7. | Phosphate as PO$_4$, mg/l | 0.3 | 4.0 | 1.57 | 17 |
| 8. | Phosphate as P, | 0.1 | 1.3 | 0.51 | 17 |

Table 3-continued

| | | Tertiary Effluent | | | |
|---|---|---|---|---|---|
| | | L | H | A | No. Tests |
| | mg/l | | | | |
| 9. | Nitrate as N, mg/l | 10 | 15. | 11.8 | 11 |
| 10. | Nitrite as NO$_3$, mg/l | 44 | 66 | 52 | 11 |
| 11. | Nitrate as N, mg/l | 0.17 | | | 1 |
| 12. | Odor | | | None | 10 |
| 13. | Turbidity, JTU | 0.95 | 5 | 2.15 | 47 |
| 14. | Color units | 80 | 130 | 104 | 7 |
| 15. | Total alkalinity as CaCO$_3$, ppm | 28 | 80 | 40 | 7 |
| 16. | Phenolphthalein as CaCo$_3$ ppm | alkalinity 0 | 0 | 0 | 7 |
| 17. | Total hardness 510 as CaCo$_3$ ppm | | | | (1) |
| 18. | Calcium hardness 290 as CaCo$_3$, ppm | | | | |
| 19. | Magnesium hardness 220 as CaCo$_3$, ppm | | | | (1) |
| 20. | Coliform bacteria, 0 MPN/100 ml (Chlorinated effluent samples, 1 ppm residual cl$_2$) | | | | |
| 21. | Flow rate thru Tertiary Column | 2 gpm/ft.$^2$ | | | |

It will be appreciated from the above results that the effluent from the system is of high quality and readily usable for a wide variety of purposes. Conceivably, with the addition of chlorination, a potable water supply may be derived. Likewise, the renovated water, preferably with the addition of a chlorine residual, is readily usable for a lawn and garden sprinkling, larger scale irrigation, home sanitation and washing operations, swimming pools, and industrial processes.

Based on an average home, or family of five persons, the cost of the chemicals for the tertiary treatment would run about two cents per person per day and with larger units the per capita cost would be reduced. Obviously, where the water is reused, a saving in water costs would materially reduce the overall cost of operation.

It will also be appreciated that in this single very compact sewage treatment plant, employing only two basic containers or tanks, as compared with the multiple installations commonly employed, the present system fully meets the goals and standards which have been established for compliance on or after Dec. 31, 1977, established by the U.S. Environmental Pollution Agency for treated discharge effluents which currently are as follows:

Table 4

POLLUTION STANDARDS

A. Deoxygenating Wastes
 1. On and after July 1, 1972, no effuent shall exceed 30 mg/l of BOD$_5$ or 37 mg/l of suspended solids.
 2. On and after July 1, 1972, no effluent from any source whose untreated waste load is 10,000 population equivalents or more, or from any source discharging into the Chicago River System or into the Calumet River System, shall exceed 20 mg/l BOD$_5$ or 25 mg/l of suspended solids.
 3. On or after Dec. 31, 1973, no effluent whose dilution ratio is less than five to one shall exceed 10 mg/l of BOD$_5$ or 12 mg/l of suspended solids.
 4. On or after Dec. 31, 1974, no effluent discharged to the Lake Michigan Basin shall exceed 4 mg/l BOD$_5$ or 5 mg/l of suspended solids.
 5. On or after Dec. 31, 1977, no effluent from any source whose untreated waste load is 500,000 population equivalents or more shall exceed 4 mg/l of BOD$_5$ or 5 mg/l of suspended solids.

B. Other Standards
 1. Bacteria - no effluent may exceed 400 fecal coliform per 100 ml after July 31, 1972.
 2. pH - shall lie within the range of 6.5 to 9.0 except for natural causes.
 3. Dissolved oxygen - shall not be less than 6.0 mg/l during at least 16 hours of any 24 hours period, nor less than 5.0 mg/l at any time.

While the accumulation of sludge heretofore has presented a problem in sewage systems of the general type here involved, operation of a pilot plant, embodying the invention, over an extended period of time has indicated that with the reflex operations involved, and the extensive aeration provided, together with anaerobic digestion in any such sludge, the latter is apparently limited to inorganic and organic matter not effectively combining with oxygen or resolved into gases, and constitutes a relatively small amount. It would appear, at the present time, that a system embodying the invention, conceivably, might run for at least a period of years without cleaning, possibly 5 years or more.

As previously mentioned the system can be employed anywhere where power is available for the various operation, and obviously is not limited solely to commercial electrical power supplies.

It will further be appreciated that the cycling operations considerably reduce the required sizes of the various units, particularly the tertiary unit, the construction of which, for practical purposes, completely eliminates relatively frequent replacement or regeneration of the carbon by removal from the unit, as is customary with many installations.

While the present disclosure has not touched upon safety devices which might be incorporated in the equipment, it is believed apparent that various monitoring devices may be employed which would give an alarm in the event the normal cycle of operation is disturbed or ceases. For example, circuits may be readily provided wherein an alarm will be given in the event a pump-down flow or regeneration flow fails to take place within the normal cycle of operation, or if a mal-function takes place with any of the other valves, pump, blower or compressor.

Having thus described our invention it will be apparent that although various minor modifications might be suggested by those versed in the art, it should be understood that we wish to embody within the scope of the patent granted hereon all such modifications as reasonably, and properly come within the scope of our contribution to the art.

We claim:

1. A method for use in the continuous, automatic cyclic treatment of sewage and waste materials, particularly those containing in excess of 25 p.p.m. BOD and in excess of 25 p.p.m. total solids, in which the accumulation of sewage in a main body is time dependent with periods of maximum and minimum average accumulation occurring in relatively uniform repetitious time sequence, comprising the steps of effecting in such main body a biological-chemical oxidation of such sewage by aerating sewage accumulating therein during periods of said maximum accumulation, followed by a setting in said main body during an initial portion of said period of minimum accumulation, introducing a prereacted floc in the effluent of said main body, prior to the end of such period of biological-chemical oxidation, to produce a substantially instantaneous floc-agglomeration with the effluent maintained at a pH favorable to such floc-agglomeration, and with the zeta potential of the effluent being stabilized at from −5 to +5 ZP, and thereafter during said period of minimum accumulation sequentially removing effluent from said main body, sequentially introducing in the removed effluent additional prereacted floc to produce a further substantially instantaneous floc-agglomeration, filtering out of said effluent previously and subsequently formed agglomerate containing suspended solids and colloidal particles, and thereafter removing by adsorption, dissolved organic solids contained in said filtered effluent, and effecting, between periods of effluent removal from the main body, an oxidation and removal of the separated and adsorbed materials derived from said filtration and adsorption steps.

2. A method according to claim 1, comprising the additional step of returning the separated and adsorbed materials removed during said oxidation and removal step to the main body.

3. A method according to claim 2, wherein operation takes place in a 24 hour cycle with the aeration period taking place during day and evening hours, settling during after-midnight hours, followed by the filtration and adsorption steps prior to the initiation of the next aeration period.

4. A method according to claim 2, wherein said rapid floc-agglomeration in the main body is effected by the addition thereto of a chemical material comprising a mixture of a coagulant providing prereacted floc, and an agglomeration-promoting material.

5. A method according to claim 2, wherein said rapid floc-agglomeration in the removed effluent is effected by the addition thereto of a chemical material comprising a mixture of a coagulant providing prereacted floc, and an agglomeration-promoting material.

6. A method according to claim 2, wherein said rapid floc-agglomeration in the main body and in the removed effluent is effected by the addition thereto of a chemical material comprising a mixture of a coagulant, providing prereacted floc and an agglomeration-promoting material.

7. A method according to claim 6, wherein approximately ½ of the total of said chemical material to be introduced into the effluent is introduced directly into the main body and the remainder introduced into the effluent removed from the main body.

8. A method according to claim 6, wherein said coagulant is present, at least in part, in the form of sodium aluminate.

9. A method according to claim 6, wherein said coagulant is present, at least in part, in the form of aluminum sulphate reacted with sodium carbonate.

10. A method according to claim 6, wherein said coagulant is selected from a class comprising sodium aluminate, and sulphates of aluminum and iron, ferric chloride reacted with an alkaline material selected from a class comprising sodium carbonate, calcium hydroxide and calcium bicarbonate 11. A method according to claim 10, wherein said coagulant material is present in excess to that required for floc formation, with such excess being present for reaction with phosphates, in an amount to materially reduce the phosphate content of the sewage being treated.

12. A method according to claim 11, wherein said floc is produced from a mixture of aluminum sulphate and sodium carbonate, and said excess coagulant is in the form of sodium aluminate.

13. A method according to claim 11, wherein said floc is produced from a mixture of aluminum sulphate and sodium carbonate, and said excess coagulant is in the form of aluminum sulphate.

14. A method according to claim 10, wherein the coagulant forming the excess is so selected, in dependence upon the acidity (pH) of the waste waters, that the reactive products therefrom in phosphate removal, in the presence of relatively high initial acidity, tend to relatively greatly increase the pH of the water, or in the presence of relatively low initial acidity, tend to affect a relatively lessor increase in the pH of the water.

15. A method according to claim 14, wherein said excess coagulant, for use with relatively high acidity, comprises sodium aluminate.

16. A method according to claim 14, wherein said excess coagulant, for use with relatively low acidity, comprises aluminium sulphate.

17. A method according to claim 10, wherein said chemicals comprise an aqueous mixture of aluminum sulphate, sodium carbonate, sodium aluminate and an organic high molecular weight polyelectrolyte providing approximate amounts per liter of effluent as follows:

| aluminum sulphate | 25 – 150 mg/l |
| sodium carbonate | 10 – 75 mg/l |
| sodium aluminate | 150 – 50 mg/l |
| polyelectrolyte | 0.5 – 10 mg/l |

18. A method according to claim 10, wherein said chemical material comprises an aqueous mixture of aluminum sulphate, sodium carbonate, and an organic high molecular weight polyelectrolyte providing approximate amounts per liter of effluent as follows:

| aluminum sulphate | 200 – 350 mg/l |
| sodium carbonate | 90 – 150 mg/l |
| polyelectrolyte | 0.5 – 10 mg/l |

19. A method according to claim 18, wherein the polyelctrolyte is non-ionic polyacrylamide.

20. A method according to claim 19, wherein the proportions of the constituents of said mixture provide:

| aluminum sulphate | 250 mg/l |
| sodium carbonate | 120 mg/l |
| polyelectrolyte | 1 mg/l |

21. A method according to claim 2, wherein said filtration and adsorption is performed by passage of the effluent through a quantity of discrete particles disposed in a plurality of generally defined layers, at least one of which functions as a filter bed and another as an adsorption bed.

22. A method according to claim 21, wherein the filter bed comprises inert mineral and the adsorption bed comprises activated carbon.

23. A method according to claim 22, wherein said adsorption bed contains inert mineral particles disposed therein in a hydraulic mix.

24. A method according to claim 21, wherein the respective beds have sufficient respective areas and heights to accommodate a predetermined effluent flow therethrough without a breakthrough of contaminating effluent therein.

25. A method according to claim 24, wherein said filter media comprises a first bottom layer of red flint having a particle size ⅜ inch to ⅝ inch, a second layer of red flint having a particle size of from ¼ inch to ½ inch, a third layer of quartz having an effective particle size of from 0.9 to 1.5 mm with a uniformity coefficient of 1.45 and the hydraulic mix comprises activated carbon having a particle size of from 1/11 inch to ¼ inch (4 × 10) with #5 quartz having a uniformity coefficient of 1.45.

26. A method according to claim 25, wherein said first layer of red flint has a vertical thickness of approximately 1 inch, said second layer a vertical thickness of approximately 1 inch, said third layer a vertical thickness of approximately 1½ inch, said fourth layer a vertical thickness of approximately 2½ inch and said carbon bed a vertical height of approximately 36 inches to 48 inches.

27. A method according to claim 2, comprising the additional steps of storing a predetermined amount of effluent derived from the filtration and adsorption steps, heating said amount of effluent to a temperature of from 100° to 170° F. and effecting said oxidation and removal of said separated and adsorbed materials by the use of a gas under pressure and said heated water.

28. A method according to claim 27, wherein air is employed as the oxidizing gas and supplied to said filter adsorption media at a pressure of 10–30 psi, and a flow rate of approximately 5–10 cuft/min.

29. A method according to claim 28, wherein the amount of water utilized in regeneration comprises approximately 20 gal/100 gals. of treated effluent.

30. A method according to claim 27, wherein oxidation by said gas under pressure is initially effected solely with gas for a predetermined time, followed by a period utilizing gas and water, with a final period of flushing solely with said water.

31. A method according to claim 27, wherein said water is supplied to said filter-adsoprtion media at a rate of approximately 2.5–5 gal/minute/ft² of media, and a total of between 10 and 25 gals/100 gals. of treated effluent.

32. A method according to claim 1, comprising the further step of withholding the addition of sewage to the main body during settling and removal periods, and thereafter adding the withheld materials to the main body.

33. A method according to claim 1, wherein the effluent from the main body is passed through the filter-adsorption beds at a rate of approximately 1–2.5 gal/minute.

34. A method for the treatment of sewage and waste materials, containing in excess of 25 p.p.m. BOD and in excess of 25 p.p.m. total solids, particularly for use in the continuous, automatic cyclic treatment of such materials, comprising the steps of accumulating such materials, effecting in a body thereof a biological-chemical oxidation of such materials by a period of aeration, effecting a settling in aerated effluent, introducing a prereacted floc in such effluent to produce a substantially instantaneous floc-agglomeration therein with the pH thereof remaining at a value favorable to floc-agglomeration and reducing the zeta potential to from −5 to +5 ZP, filtering out of said effluent of agglomerate so formed containing substantially all suspended and colloidal materials, thereafter removing by adsorption, dissolved organic materials contained in said filtered effluent, thereafter collecting separated and adsorbed materials derived from said filtration and adsorption steps by a wet-gas oxidation, and returning materials so collected to the main body for further oxidation and reduction therein.

35. A method according to claim 34, wherein a relatively rapid floc-agglomeration is produced in the main body prior to completion of the settling operation, thereafter sequentially removing effluent from the main body and subsequently effecting said filtering and adsorption steps.

36. A method according to claim 34, comprising in further combination, the step of sequentially removing effluent from the main body following the settling operation, sequentially producing substantially instantaneous floc-agglomeration in the removed effluent, and thereafter effecting said filtering and adsorption steps.

37. A method according to claim 34, wherein a relatively rapid floc-agglomeration is produced in the main body prior to completion of the settling operation, sequentially removing effluent from the main body, following the settling operation, sequentially producing additional rapid floc-agglomeration in the removed effluent, and thereafter effecting said filtering and adsorption steps.

38. A method according to claim 34, wherein said floc-agglomeration is produced by the introduction in the effluent of a predetermined quantity of a chemical material comprising a mixture of a coagulant producing a prereactive floc, and an agglomeration-promoting material.

39. A material according to claim 38, wherein said coagulant is selected from a class comprising sodium aluminate, and sulphates of aluminum and iron, ferric chloride reacted with an alkaline material selected from a class comprising sodium carbonate, calcium hydroxide and calcium bicarbonate.

40. A method according to claim 39, wherein said chemical material comprises an aqueous mixture of aluminum sulphate, sodium carbonate, and an organic high molecular weight polyelectrolyte, providing approximate amounts per liter of effluent as follows:

| | |
|---|---|
| aluminum sulphate | 200 – 350 mg/l |
| sodium carbonate | 90 – 150 mg/l |
| polyelectrolyte | 0.5 – 10 mg/l |

41. A method according to claim 40, wherein the polyelectrolyte is a non-ionic polyacrylamide.

42. A method according to claim 41, wherein the proportions of the constituents of said mixture provide:

| | |
|---|---|
| aluminum sulphate | 250 mg/l |
| sodium carbonate | 120 mg/l |
| polyelectrolyte | 1 mg/l |

43. A method according to claim 42, wherein said filtration and adsorption if performed by passage of the effluent through a quantity of discrete particles disposed in a plurality of generally defined layers, at least one of which functions as a filter media and another as an adsorption media.

44. A method according to claim 43, wherein the filter media comprises inert mineral and the adsorption media comprises activated carbon.

45. A method according to claim 44, wherein said adsorption media contains inert mineral particles disposed therein in a hydraulic mix.

46. A method according to claim 45, wherein said filter media comprises a first bottom layer of red flint a particle size of ⅜ inch to ⅝ inch, a second layer of red flint having a particle size of from ¼ inch to ½ inch, a third layer of quartz having an effective particle size of from 0.9 to 1.5 mm with a uniformity coefficient of 1.45 and the hydraulic mix comprises activated carbon having a particle size of from 1/11 inch to ¼ inch (4 × 10) with #5 quartz having a uniformity coefficient of 1.45.

47. A method according to claim 46, wherein said first layer of red flint has a vertical thickness of approximately 1 inch, said second layer a vertical thickness of approximately 1 inch, said third layer a vertical thickness of approximately 1½ inches said fourth layer a vertical thickness of approximately 2½ inches and said carbon bed a vertical height of approximately 36 inches to 48 inches.

48. A method according to claim 43, wherein the effluent from the main body is passed through the filter-adsorption media at a rate of appriximately 1-5 gal/minute.

49. A method according to claim 48, wherein the respective filter and adsorption media have sufficient respective areas and heights to accommodate a predetermined effluent flow therethrough without the breakthrough of contaminating effluent therein.

50. A method according to claim 39, wherein a portion of said chemical material is introduced directly to the main body and the remainder is sequentially introduced into effluent subsequent to a sequential removal thereof from the main body.

51. A method according to claim 50, wherein approximately ½ of the total of said chemical material to be introduced into the effluent is introduced directly into the main body and the remainder introduced into the effluent removed from the main body.

52. A method according to claim 51, wherein said water is supplied to said filter-adsorption media at a rate of approximately 2.5-5 gal/minute/ft² of media, and a total of between 10 and 25 gals/100 gal of treated effluent.

53. A method according to claim 52, wherein air is employed as the oxidizing gas and supplied to said filter adsorption media at a pressure of 10-30 psi, and at a flow rate of approximately 5-10 cuft/min.

54. A method according to claim 53, wherein the amount of water utilized in regeneration comprises approximately 20 gals/100 gals of treated effluent.

55. A method according to claim 54, wherein said air is supplied for a period of 5-20 minutes.

56. A method according to claim 55, wherein said filtration and adsorption is performed by passage of the effluent through a quantity of discrete particles disposed in a plurality of generally defined layers, at least one of which functions as a filter media and another as an adsorption media.

57. A method according to claim 56, wherein the filter media comprises inert mineral and the adsorption media comprises activated carbon.

58. A method according to claim 57, wherein said adsorption media contains inert mineral particles disposed therein in a hydraulic mix.

59. A method according to claim 58, wherein the filter and adsorption media have sufficient respective areas and heights to accommodate a predetermined effluent flow therethrough without a breakthrough of contaminated effluent therein.

60. A method according to claim 59, wherein said filter media comprises a first bottom layer of red flint having a particle size of ⅜ inch to ⅝ inch, a second layer of red flint having a particle size of from ¼ inch to ½ inch, a third layer of quartz having an effective particle size of from 0.9 to 1.5 mm with a uniformity coefficient of 1.45 and the hydraulic mix comprises activated carbon having a particle size of from 1/11 inch to ¼ inch (4 × 10) with #5 quartz having a uniformity coefficient of 1.45.

61. A method according to claim 60, wherein said first layer of red flint has a vertical thickness of approximately 1 inch, said second layer a vertical thickness of approximately 1 inch, said third layer a vertical thickness of approximately 1½ inches, said fourth layer a vertical thickness of approximately 2½ inches and said carbon bed a vertical height of approximately 36 inches to 48 inches.

62. A method according to claim 61, comprising additional steps of storing a predetermined amount of purified effluent derived from the filtration and adsorption steps, heating said amount of effluent to a temperature of from 100° to 170° F. and effecting said wet-gas oxidation by the use of a gas under pressure and said heated water.

63. A method according to claim 62, wherein oxidation by said gas under pressure is initially effected for a predetermined time, solely with gas followed by a period of combined flow of gas and water and terminated with a period solely with water.

64. A method according to claim 63, wherein said water is supplied to said filter-adsorption media at a rate of approximately 2.5-5 gal/minute/ft² of media, and a total of between 10 and 25 gals/ 100 gal of treated effluent.

65. A method according to claim 64, wherein air is employed as the oxidizing gas and supplied to said filter adsorption media at a pressure of 10-30 psi, and at a flow rate of approximately 5-10 cuft/min.

66. A method according to claim 65, wherein the amount of water is utilized in regeneration comprises approximately 20 gals/100 gals of treated effluent.

67. A method according to claim 66, wherein said air is supplied for a period of 3 minutes, combined flow supplied for a period of 12 minutes and the flushing flow for a period of 4 minutes.

68. A method according to claim 67, wherein the effluent from the main body is passed through the filter-adsorption media at a rate of approximately 1-5 gal/minute.

69. A method according to claim 34, comprising additional steps of storing a predetermined amount of effluent derived from the filtration and adsorption steps, heating said amount of effluent to a temperature of from 100° to 170° F. and effecting said wet-gas oxidation by the use of a gas under pressure and said heated water.

70. A method according to claim 69, wherein oxidation by said gas under pressure is initially effected for a predetermined time, followed by a combined flow of gas and water and terminated by a flushing solely with said heated water.

71. A method of effecting filtration-adsorption of materials contained in an effluent, and regeneration of the filtration-adsorption media, comprising the steps of cyclicly passing the effluent to be treated upwardly through a filtration-adsorption media comprising a quantity of discrete particles disposed in a plurality of generally defined layers, at least one of which functions as a filter bed and at least one other layer thereabove functions as an adsorption bed for the removal of dissolved organic materials in the filtered effluent, providing sufficient bed areas and bed heights to accommodate a predetermined effluent flow therethrough without a breakthrough of contaminating effluent therein, and regenerating the media intermediate effluent flow cycles by a wet-oxidation comprising passing an oxidizing gas under pressure and flushing water under pressure upwardly through the media, in-situ, to effect oxidation and removal of separated and adsorbed material therefrom, preparatory to the next cycle of effluent passage therethrough.

72. A method according to claim 71, wherein the filter media comprises inert mineral and the adsorption media comprises activated carbon.

73. A method according to claim 72, wherein said adsorption media contains inert mineral particles disposed therein in a hydraulic mix.

74. A method according to claim 71, comprising the further step of heating the flushing water to a temperature of from 100° to 170°.

75. A method according to claim 71, wherein oxidation by said gas under pressure is initially effected for a predetermined time, solely with such gas followed by a combined flow of gas and water, and concludedly flushing solely with water.

76. A method according to claim 75, wherein said water is supplied to said filter-adsorption media at a rate of approximately 2.5–5 gal/minute/ft$^2$ of media, and a total of between 10 and 25 gals/100 gal of treated effluent.

77. A method according to claim 76, wherein said air is supplied for a period of 5–20 minutes.

78. A method according to claim 77, wherein the amount of water utilized in regeneration comprises approximately 20 gals/100 gal of treated effluent.

79. A method according to claim 75, wherein air is employed as the oxidizing gas and supplied to said filter adsorption media at a pressure of 10–30 psi, and at a flow rate of approximately 5–10 cuft/min.

80. A method according to claim 71, wherein the effluent is passed through the filter-adsorption media at a rate of approximately 1–5 gal/minute.

81. A method of treating water in connection with the purification thereof, in the removal of phosphates, suspended and colloidal materials, comprising the steps of simultaneously introducing in such water prereacted floc formed prior to such introduction from a water soluble coagulant, providing substantially instantaneous floc-agglomeration, with the proportions of the respective materials being operative to provide sufficient floc-agglomeration for the removal of substantially all suspended and colloidal material in such water, and a sufficient amount of coagulant for reaction with all of the reactionable phosphates present in such water, and a floc-agglomeration-promoting material present in an amount materially promoting agglomeration, the respective totals of prereacted floc, coagulant and agglomeration-promoting material being present in amount sufficient for effecting the specified purposes, but insufficient to undesirably affect the pH of such water or the zeta potential, and thereafter removing all the precipitated and agglomerated materials from the effluent.

82. A method according to claim 81, wherein said removal is effected by the steps of settling, filtration and adsorption.

83. A method according to claim 82, wherein said filtration and adsorption is performed by passage of the effluent through a quantity of discrete particles disposed in a plurality of generally defined layers, at least one of which functions as a filter bed and another as an adsorption bed.

84. A method according to claim 83, wherein the filter bed comprises inert mineral and the adsorption bed comprises activated carbon.

85. A method according to claim 84, wherein said adsorption bed contains inert mineral particles disposed therein in a hydraulic mix.

86. A method according to claim 85, wherein the respective beds have sufficient respective areas and heights to accommodate a predetermined effluent flow therethrough without a breakthrough of contaminated effluent therein.

87. A method according to claim 81, wherein said prereacted floc is produced from a coagulant selected from a class comrising sodium aluminate, and iron, and ferric chloride, reacted with a material selected from a class comprising sodium carbonate, calcium hydroxide and calcium bicarbonate.

88. A method according to claim 87, wherein said coagulant material is present in excess to that required for floc formation, with such excess being present for reaction with phosphates, in an amount to materially reduce the phosphate content of the sewage being treated.

89. A method according to claim 88, wherein said floc is produced from a mixture of aluminum sulphate and sodium carbonate, and said excess coagulant is in the form of sodium aluminate.

90. A method according to claim 88, wherein said floc is produced from a mixture of aluminum sulphate and sodium carbonate, and said excess coagulant is in the form of aluminum sulphate.

91. A method according to claim 87, wherein the coagulant forming the excess is so selected, in dependence upon the acidity (-pH) of the waste waters, that the reactive products therefrom in phosphate removal, in the present of relatively high initial acidity, tend to relatively greatly increase the pH of the water, or in the presence of relatively low initial acidity, tend to affect a relatively lesser increase in the pH of the water.

92. A method according to claim 91, wherein said excess coagulant, for use with relatively high acidity, comprises sodium aluminate.

93. A method according to claim 91, wherein said excess coagulant, for use with relatively low acidity, comprises aluminum sulphate.

94. A method according to claim 87, wherein said chemicals comprise an aqueous mixture of aluminum sulphate, sodium carbonate, sodium aluminate and an organic high molecular weight polyelectrolyte, providing approximate amounts per liter of effluent as follows:

| | |
|---|---|
| aluminum sulphate | 25 – 150 mg/l |
| sodium carbonate | 10 – 75 mg/l |
| sodium aluminate | 150 – 50 mg/l |
| polyelectrolyte | 0.5 – 10 mg/l |

95. A method according to claim 87, wherein said chemical material comprises an aqueous mixture of aluminum sulphate, sodium carbonate and an organic high molecular weight polyelectrolyte providing approximate amounts per liter of effluent as follows:

| | |
|---|---|
| aluminum sulphate | 200 – 350 mg/l |
| sodium carbonate | 90 – 150 mg/l |
| polyelectrolyte | .5 – 10 mg/l |

96. A method according to claim 95, wherein the proportions of the constituents of said mixture provide:

| | |
|---|---|
| aluminum sulphate | 250 mg/l |
| sodium carbonate | 120 mg/l |
| polyelectrolyte | 1 mg/l |

97. A method according to claim 96, wherein the polyelectrolyte is non-ionic polyacrylamide.

* * * * *

UNITED STATES PATENT AND TRADEMARK OFFICE
CERTIFICATE OF CORRECTION

PATENT NO. : 4,081,365
DATED : March 28, 1978
INVENTOR(S) : Eugene B. White, et al.

It is certified that error appears in the above-identified patent and that said Letters Patent are hereby corrected as shown below:

Column 3, line 4, change "reflex" to --reflux--; line 7, change "flex to --flux--.
Column 10, line 48, change "side" to --side walls--.
Column 13, line 45, change "adn" to --and--.
Column 15, line 45, change "corresponding" to --correspondingly--.
Column 16, line 12, change "te" to --the--.
Column 18, line 40, change "($Al_2$)SO4)$_3 \cdot$ 14$H_2$O)" to --$Al_2(SO_4)_3$ 14$H_2$O--.
Column 20, line 8, change "150-0 mg/1" to --0-150 mg/1--.
Column 21, line 16, change "settlement" to --settleable--; line 34, change "b3. Final" to --3. Final--; line 39, change "Ca(OA)$_2$" to --Ca(OH)$_2$--.
Column 22, line 37, change "Na(OH)" to --NaOH--.
Column 24, line 1, change "liers" to --liters--.
Column 25, line 38, change "18-15 CF" to --18-25 CF--; line 48, change "3 feet" to --3 sq. feet--; line 55, change "1-1/2" to --1-1/2 inch--.
Column 27, line 45, change "seps" to --steps--.

UNITED STATES PATENT AND TRADEMARK OFFICE
CERTIFICATE OF CORRECTION

PATENT NO. : 4,081,365                                Page 2 of 3

DATED : March 28, 1978

INVENTOR(S) : Eugene B. White, et al.

It is certified that error appears in the above-identified patent and that said Letters Patent are hereby corrected as shown below:

Column 28, Table 2, for constituent "$BOD_5 20°C$" change value for "High" from "0.3" to --3.0--; for constituent "Nitrate as N" change for "Average Test" from "--" to --11.8--.

Column 29, Table 3, item 10, change "Nitrite as $NO_3$" to --Nitrate as $NO_3$--; item 11, change "Nitrate as N" to --Nitrite as N--; item 16, change "Phenolphthalein as $CaCo_3$ ppm" to --Phenolphthalein alkalinity as $CaCO_3$, 0 ppm-- and delete "alkalinity 0" under value for "L"; item 17, change "Total hardness 510 as $CaCo_3$ ppm" to --Total hardness as $CaCO_3$, 510 ppm-- and delete "(1)" under value for "A"; item 18, change "Calcium hardness 290 as $CaCo_3$, ppm" to --Calcium hardness as $CaCO_3$, 290ppm--; item 19, change "Magnesium hardness 220 as $CaCo_3$, ppm" to --Magnesium hardness as $CaCO_3$, 220ppm-- and delete "(1)" under value for "A";

UNITED STATES PATENT AND TRADEMARK OFFICE
CERTIFICATE OF CORRECTION

PATENT NO. : 4,081,365      Page 3 of 3
DATED : March 28, 1978
INVENTOR(S) : Eugene B. White, et al.

It is certified that error appears in the above–identified patent and that said Letters Patent are hereby corrected as shown below:

item 21, change "Flow rate thru Tertiary Column" to --Flow rate thru Tertiary Column, 2 gpm/ft$^2$-- and delete "2 gpm/ft$^2$" under value for "L".

Column 30, line 66, change "setting" to --settling--.
Column 32, line 33, change "150-50 mg/l" to --50-150 mg/l--.
Column 33, line 68, change "agglomerationand" to --agglomeration and--.
Column 38, line 25, change "comrising" to --comprising--; line 47, change "present" to --presence--; line 66, change "150-50 mg/l" to --50-150 mg/l--.

Signed and Sealed this

Twenty-second Day of July 1980

[SEAL]

Attest:

SIDNEY A. DIAMOND

Attesting Officer      Commissioner of Patents and Trademarks